(12) United States Patent
Yasuda et al.

(10) Patent No.: US 10,657,925 B2
(45) Date of Patent: May 19, 2020

(54) DISPLAY DEVICE AND CONTROL METHOD FOR CONVERSION OF LUMINANCE INFORMATION

(71) Applicant: SEIKO EPSON CORPORATION, Tokyo (JP)

(72) Inventors: Yutaka Yasuda, Matsumoto (JP); Tatsuya Kaido, Matsumoto (JP); Kazuyoshi Kitabayashi, Azumino (JP); Takahiro Ano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/049,241

(22) Filed: Jul. 30, 2018

(65) Prior Publication Data
US 2019/0043444 A1 Feb. 7, 2019

(30) Foreign Application Priority Data

Aug. 7, 2017 (JP) .................................. 2017-152346

(51) Int. Cl.
| | |
|---|---|
| G09G 5/02 | (2006.01) |
| G09G 5/377 | (2006.01) |
| H04N 9/31 | (2006.01) |
| H04N 9/76 | (2006.01) |
| H04N 5/445 | (2011.01) |

(52) U.S. Cl.
CPC ............. *G09G 5/026* (2013.01); *G09G 5/377* (2013.01); *H04N 9/3182* (2013.01); *H04N 9/76* (2013.01); *G09G 2340/12* (2013.01); *H04N 5/44504* (2013.01)

(58) Field of Classification Search
CPC ..... G09G 2340/12; G09G 5/026; G09G 5/377
See application file for complete search history.

(56) References Cited

U.S. PATENT DOCUMENTS

| | | | |
|---|---|---|---|
| 7,440,590 B1 * | 10/2008 | Hassebrook ....... | G01B 11/2513 345/582 |
| 9,141,323 B1 | 9/2015 | Ono | |
| 2002/0008783 A1 * | 1/2002 | Kurashige ................ | H04N 9/74 348/590 |

(Continued)

FOREIGN PATENT DOCUMENTS

| | | |
|---|---|---|
| JP | 2008-102332 A | 5/2008 |
| JP | 2010-145945 A | 7/2010 |

(Continued)

OTHER PUBLICATIONS

Panasonic "Operating Instructions: Functional Manual: DLP Projector," Model No. PT-JX200FBE and PT-JX200FWE, pp. 1-144.

(Continued)

*Primary Examiner* — Terrell M Robinson
(74) *Attorney, Agent, or Firm* — Oliff PLC

(57) ABSTRACT

A projector includes a video processing section configured to generate a third image by combining, on the basis of transmittance, a first image based on first image information and a second image generated by converting luminance information of second image information including the luminance information into the transmittance and an image forming section configured to display the third image.

10 Claims, 13 Drawing Sheets

(56) References Cited

U.S. PATENT DOCUMENTS

| | | | | |
|---|---|---|---|---|
| 2005/0275911 A1* | 12/2005 | Yamada | ............ | H04N 1/60 358/518 |
| 2008/0266321 A1* | 10/2008 | Aufranc | ............ | G03B 21/26 345/626 |
| 2008/0301621 A1* | 12/2008 | Fukuhara | ............ | G03F 1/36 716/51 |
| 2011/0142349 A1* | 6/2011 | Saijo | ............ | G06K 9/00355 382/195 |
| 2011/0206282 A1* | 8/2011 | Aisaka | ............ | G06T 11/60 382/195 |
| 2014/0029804 A1* | 1/2014 | Kawaguchi | ............ | G06T 11/60 382/105 |
| 2015/0268909 A1 | 9/2015 | Ono | | |
| 2016/0255312 A1* | 9/2016 | Hamada | ............ | H04N 5/74 353/20 |
| 2017/0323618 A1* | 11/2017 | Takanashi | ............ | G06F 3/04847 |

FOREIGN PATENT DOCUMENTS

| | | | | |
|---|---|---|---|---|
| JP | 2011-82798 | A | | 4/2011 |
| JP | 2011082798 | A | * | 4/2011 |
| JP | 2012-013743 | A | | 1/2012 |
| JP | 2012013743 | A | * | 1/2012 |
| JP | 2012-168365 | A | | 9/2012 |
| JP | 2012168365 | A | * | 9/2012 |
| JP | 2015-184833 | A | | 10/2015 |

OTHER PUBLICATIONS

Panasonic "Operating Instructions: Functional Manual: DLP Projector," Model No. PT-JW130FBE and PT-JW130FWE, pp. 1-217.

* cited by examiner

DISPLAY DEVICE AND CONTROL METHOD FOR CONVERSION OF LUMINANCE INFORMATION

CROSS-REFERENCE

The entire disclosure of Japanese Patent Application No. 2017-152346, filed Aug. 7, 2017 is expressly incorporated by reference herein.

BACKGROUND

1. Technical Field

The present invention relates to a display device and a control method for the display device.

2. Related Art

There has been known a technique for, in a display device that displays an image, combining a mask image with the image to be displayed (see, for example, JP-A-2012-013743 (Patent Literature 1)). A projector described in Patent Literature 1 projects a blend image obtained by alpha-blending a mask image in an input image.

In the related art, in processing for overlapping the mask image on a combination source image, the transmittance of the mask image is applied to the entire mask image. Therefore, the image to be displayed is an image obtained by mixing the combination source image and the mask image according to the transmittance. However, there has been a demand for a technique that can give richer expressive effect to the combination source image.

SUMMARY

An advantage of some aspects of the invention is to provide a display device and a control method for the display device capable of giving rich expressive effect to a processing target image or video by combining an image with the processing target image or video.

An aspect of the invention provides a display device including: an image generating section configured to generate a third image by combining, on the basis of transmittance, a first image based on first image information and a second image generated by converting luminance information of second image information including the luminance information into the transmittance; and a display section configured to display the third image.

According to the aspect of the invention, it is possible to combine the second image with the first image at the transmittance set by reflecting the luminance information and display a combined image. Consequently, it is possible to give new gradation expression to the first image by using the second image having a gradation of the transmittance generated on the basis of, for example, the second image information having the luminance information subjected to gradation expression. It is possible to give a change in expression by a position and a shape in an image to the first image by, for example, combining, with the first image, the second image generated on the basis of the second image information having a difference in luminance information in the image. In this way, by combining, with the first image, the second image obtained by converting the luminance information of the second image information into the transmittance, it is possible to give rich expressive effect to the first image and display the first image.

In the display device according to the aspect of the invention, the first image may include a plurality of pixels, the second image information may include luminance information for each of regions including a plurality of pixels or each of the pixels, and the image generating section may combine, with the first image, on the basis of the second image information, the second image including a plurality of pixels and having transmittance for each of regions including the plurality of pixels or each of the pixels to generate the third image.

With this configuration, the second image is combined with the first image according to the transmittance obtained by converting the luminance information for each of the regions or each of the pixels. Consequently, the third image is formed as an image obtained by giving a change for each of the regions or each of the pixels to the first image. It is possible to display the first image in rich expressive form.

In the display device according to the aspect of the invention, the display device may further include a control section configured to cause the display section to display an image for selection corresponding to each of a plurality of kinds of the second image information and cause the image generating section to process the second image information corresponding to the image for selection selected from a displayed plurality of the images for selection.

With this configuration, the second image information selected from the plurality of kinds of second image information can be combined with the first image. Therefore, it is possible to give a variety of effects to the first image.

In the display device according to the aspect of the invention, the control section may adjust a form of combining, with the first image, the second image generated from the second image information corresponding to the selected image for selection.

With this configuration, it is possible to give richer expressive effect to the first image and display the first image.

In the display device according to the aspect of the invention, the control section may adjust at least one or more of a position of a range combined with the first image in the second image, a size of the range combined with the first image in the second image, a shape of the range combined with the first image in the second image, a color of the second image, and concentration in combining the second image with the first image.

With this configuration, it is possible to change an effect given to the first image using one second image. It is possible to give a variety of effects to the first image.

In the display device according to the aspect of the invention, the control section may select, from a selectable plurality of conversion systems, a conversion system for converting the luminance information of the second image information into the transmittance, and the image generating section may combine the second image, the luminance information of which is converted into the transmittance by the conversion system selected by the control section, and the first image.

With this configuration, it is possible to change an effect given to the first image using the second image information. It is possible to give a variety of effects to the first image.

In the display device according to the aspect of the invention, the image for selection may be an achromatic image generated from the second image information.

With this configuration, because luminance of the second image information is clearly reflected on the image for selection, it is possible to satisfactorily grasp, with the image for selection, transmittance in combining the second image with the first image. Therefore, an effect given to the first image is easily known. It is possible to easily select the second image information.

In the display device according to the aspect of the invention, the image for selection may be the second image generated from the second image information.

With this configuration, an effect given to the first image by the second image information is easily known. It is possible to easily select the second image information.

In the display device according to the aspect of the invention, the image generating section may generate the third image according to correspondence information that associates the first image to be combined and the second image information or the second image to be combined.

With this configuration, it is possible to preset and automate processing for combining the second image with the first image.

In the display device according to the aspect of the invention, the image generating section may generate the third image according to combination information for deciding timing when the display section displays the third image and content of processing for generating the third image with the image generating section.

With this configuration, it is possible to set content of processing for combining an image according to the timing for displaying the third image.

In the display device according to the aspect of the invention, the display device may further include a reading section configured to read data stored in a storage medium, and, when the first image information, the second image information, and the correspondence information are read from a singularity of the storage medium by the reading section, the image generating section may generate, according to the correspondence information read by the reading section, the third image on the basis of the first image information and the second image information read by the reading section.

With this configuration, by storing the first image information, the second image information, and the correspondence information in one storage medium, it is possible to automate the processing for combining the second image with the first image.

Another aspect of the invention provides a control method for a display device including a display section. The control method includes: generating a third image by combining, on the basis of transmittance, a first image based on first image information and a second image generated by converting luminance information of second image information including the luminance information into the transmittance; and displaying the third image with the display section.

According to the aspect of the invention, it is possible to combine the second image with the first image at the transmittance set by reflecting the luminance information and display a combined image. Consequently, it is possible to give new gradation expression to the first image by using the second image having a gradation of the transmittance generated on the basis of, for example, the second image information having the luminance information subjected to gradation expression. It is possible to give a change in expression by a position and a shape in an image to the first image by, for example, combining, with the first image, the second image generated on the basis of the second image information having a difference in luminance information in the image. In this way, by combining, with the first image, the second image obtained by converting the luminance information of the second image information into the transmittance, it is possible to give rich expressive effect to the first image and display the first image.

The invention can also be realized in various forms other than the display device and the control method for the display device explained above. The invention can be realized in forms of, for example, a computer program for executing the control method with a computer, a storage medium having the computer program recorded therein, a server apparatus that distributes the computer program, a transmission medium that transmits the computer program, and data or a signal obtained by embodying the computer program in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An embodiment applied with the invention is explained below with reference to the drawings.

Figure 1:
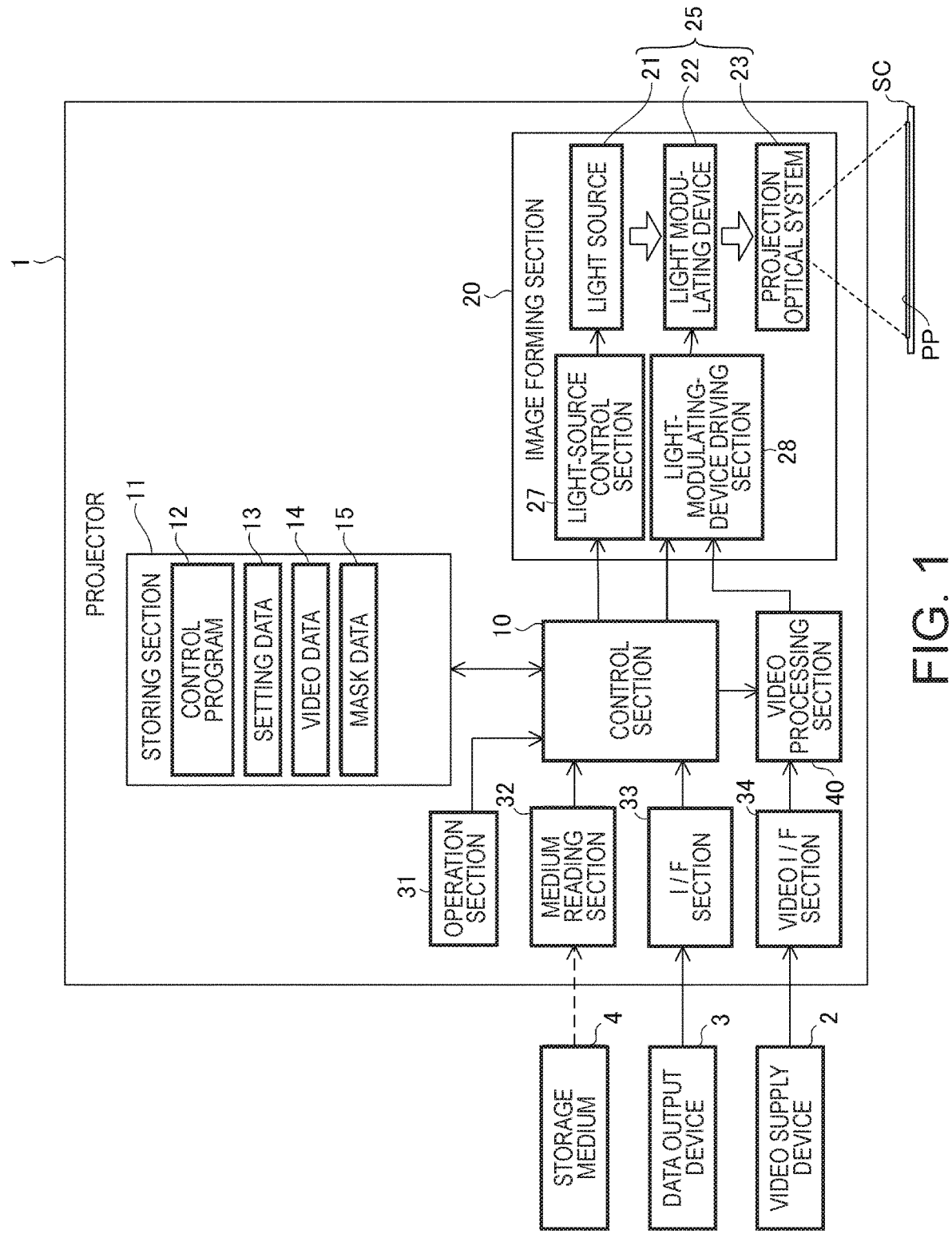
FIG. 1 is a block diagram of a projector according to a first embodiment.

FIG. 1 is a block diagram of a projector 1 according to the embodiment applied with the invention.

The projector 1 is a display device that projects image light onto a screen SC to thereby project (display) a projection image PP on the screen SC. The projector 1 may project either a still image or a video (a moving image) as the projection image PP. In the following explanation, the projection image PP is described as the "video". Even when the projector 1 projects the still image, the projector 1 updates the projection image PP at a set frame rate with an image forming section 20. Therefore, a substantial operation of the projector 1 is not different in the still image and the video.

The screen SC may be a curtain-like screen set on a wall surface, a ceiling surface, or a floor surface in a room of a building. However, the wall surface may be used as the screen SC. A plane of a set object such as a white board or a piece of furniture may be used as the screen SC. The screen SC is not limited to a plane and may be a curved surface or a surface having unevenness.

The projector 1 can use, as a video source of the projection image PP, video data 14 stored in a storing section 11 explained below. The video source of the projector 1 can be selected from a video signal input from a video supply device 2 to the projector 1, video data input from a data output device 3 to the projector 1, video data stored in a storage medium 4, and the like.

The video supply device 2 is connected to the projector 1 via a cable or a wireless communication line. The video supply device 2 outputs an analog video signal or a digital video signal to the projector 1. The analog video signal is, for example, an analog video signal, a composite video signal, or the like transmitted via a D-Sub connector or a D terminal. The digital video signal is, for example, a signal transmitted via various digital interfaces. Specifically, examples of the digital video signal include signals transmitted by an HDMI (registered trademark), a DVI, a Displayport (registered trademark), and the like. The digital video signal may be input from the video supply device 2 to the projector 1 via a wireless interface such as a Miracast (registered trademark), a Wireless HD (registered trademark), or the like. In the following explanation, the analog video signal and the digital video signal are collectively referred to as video signal. The video supply device 2 is, for example, a video reproducing device such as a DVD player, a broadcast receiving device such as a digital television tuner, or a video output device such as a video game machine or a personal computer. The video supply device 2 may be a communication device or the like that communicates with a personal computer or the like to receive video data.

The data output device 3 is a device that outputs digital data of a video to the projector 1. The data output device 3 outputs, for example, a file encoded in a MPEG format to the projector 1. The data output device 3 only has to be a device capable of inputting and outputting digital data of a video in a file format. Specifically, the data output device 3 is a personal computer, a DVD player, a HDD recorder, or the like.

The storage medium 4 is configured by a semiconductor storage device, a magnetic storage device, an optical storage medium, or the like. The storage medium 4 stores data in a nonvolatile manner. For example, the storage medium 4 may be an optical storage medium such as a DVD, a memory device such as a USB memory, or a card-type storage medium such as an SD (registered trademark) card.

The projector 1 includes a control section 10, a storing section 11, an image forming section 20, an operation section 31, a medium reading section 32, an I/F section 33, a video I/F section 34, and a video processing section 40.

The control section 10 includes a processor such as a CPU (not shown in FIG. 1). The control section 10 may include a ROM (not shown in FIG. 1) that stores, in a nonvolatile manner, computer programs and the like executed by the processor and a RAM (not shown in FIG. 1) that forms a work area used by the processor. The control section 10 executes, with the processor, computer programs stored by the ROM (not shown in FIG. 1) and the storing section 11 to thereby control the sections of the projector 1 to execute various operations related to projection of the projection image PP. Note that the control section 10 may include a plurality of processors.

The storing section 11 includes a semiconductor storage device and a magnetic storage device. The storing section 11 stores, in a nonvolatile manner, computer programs to be executed by the processor of the control section 10 and data to be processed by the processor. The storing section 11 stores, for example, a control program 12 to be executed by the control section 10. The storing section 11 stores setting data 13, video data 14, and mask data 15. The setting data 13 includes information set concerning the operation of the projector 1. The video data 14 is video data usable as a video source of the projection image PP. For example, like video data input from the data output device 3 to the projector 1, the video data 14 is data of a file format. The video data 14 may be data obtained by the control section 10 acquiring the video data input from the data output device 3 to the projector 1 and causing the storing section 11 to store the video data. As explained below, the mask data 15 is data used when the projector 1 gives an illumination effect to the projection image PP.

The operation section 31 receives input operation of a user concerning a function of the projector 1. The operation section 31 is configured by, for example, an operation panel (not shown in FIG. 1) provided in a main body of the projector 1. The operation section 31 detects operation on various switches disposed on the operation panel and outputs an operation signal to the control section 10. The operation section 31 may include a light receiving section (not shown in FIG. 1) that receives an infrared ray signal transmitted by a remote control device (not shown in FIG. 1) of the projector 1. In this case, the operation section 31 decodes the infrared ray signal received from the remote control device and outputs an operation signal corresponding to operation of the remote control device to the control section 10.

The medium reading section 32 (a reading section) is an interface that reads out data stored in the storage medium 4. The medium reading section 32 may be capable of writing data in and erasing data from the storage medium 4. The medium reading section 32 reads, according to control by the control section 10, video data stored in the storage medium 4 as a video source and outputs the video data to the control section 10.

The medium reading section 32 may include, for example, a USB connector to which the storage medium 4 functioning as a USB memory is connected, a card slot to which the storage medium 4 of a card type is inserted, and a drive that reproduces an optical storage medium such as a DVD.

The I/F section 33 (an input section) is an interface connected to the data output device 3. The I/F section 33 is configured using, for example, a publicly-known data communication interface. Specifically, the I/F section 33 may be a USB interface connectable to the data output device 3 by a communication cable, a LAN (including an Ethernet (registered trademark)) interface, an IEEE 1394 interface, or the like. The I/F section 33 may be a wireless communication interface in which a wireless communication line is used. Specifically, the I/F section 33 may include a communication interface that performs communication through a wireless LAN (including a Wi-Fi (registered trademark)), a Bluetooth (registered trademark), or a ZigBee (registered trademark). The I/F section 33 may include an interface circuit that executes, when being connected to the data output device 3, a function of detecting connection of the data output device 3, a function of establishing communication between the I/F section 33 and the data output device 3, a function of supplying electric power to the data output device 3, and the like.

The control section 10 can execute, with the I/F section 33, data communication between the control section 10 and the data output device 3 and acquire video data output by the data output device 3.

The video I/F section 34 is an interface connected to the video supply device 2. The video I/F section 34 is configured using, for example, a publicly-known video input interface. Specifically, the video I/F section 34 includes, for example, an interface such as the D-sub connector, the D terminal, the composite video terminal, the HDMI, the DVI, or the Displayport. The video I/F section 34 may be a wireless interface such as a Miracast or a Wireless HD. The video I/F section 34 outputs a video signal input from the video supply device 2 to the video processing section 40. The video I/F section 34 may execute data communication between the video I/F section 34 and the video supply device 2 and perform, for example, discrimination of a model and a vendor name of the video supply device 2 and acquisition of information concerning a video signal input from the video supply device 2 according to the control by the control section 10.

The image forming section 20 (a display section) that forms the projection image PP includes a projecting section 25, a light-source control section 27, and a light-modulating-device driving section 28. The projecting section 25 includes a light source 21, a light modulating device 22, and a projection optical system 23.

The light source 21 is configured by a lamp such as a Xenon lamp or an ultra-high pressure mercury lamp or a solid-state light source such as an LED or a laser light source. The light source 21 is lit by electric power supplied from the light-source control section 27 and emits light toward the light modulating device 22. The light-source control section 27 can adjust light emission luminance of the light source 21 according to the control by the control section 10.

The light modulating device 22 modulates the light emitted by the light source 21 to generate image light and irradiates the image light on the projection optical system 23. In this embodiment, a configuration is illustrated in which the light modulating device 22 includes three liquid crystal light valves corresponding to respective colors of red (R), green (G), and blue (B) and transmits the light emitted by the light source 21 to the liquid crystal light valves.

The light-modulating-device driving section 28 is connected to the three liquid crystal light valves of the light modulating device 22. The light-modulating-device driving section 28 drives pixels of the liquid crystal light valves on the basis of a video signal output by the video processing section 40 and draws an image in frame (screen) units on the liquid crystal light valves.

A reflector, a lens group (not shown in FIG. 1), a polarization plate, a dimming element, and the like may be provided in an optical path between the light source 21 and the light modulating device 22 or the light modulating device 22. The light modulating device 22 can include a reflection-type liquid crystal panel. In this case, the light modulating device 22 causes the liquid crystal panel to reflect the light emitted by the light source 21 and guides reflected light to the projection optical system 23. The light modulating device 22 can include a digital mirror device (DMD). The light modulating device 22 may include one DMD and a color wheel. The light modulating device 22 may include a reflection-type liquid crystal display panel.

The projection optical system 23 guides the image light modulated by the light modulating device 22 toward the screen SC and forms the projection image PP on the screen SC. The projection optical system 23 may include optical elements such as a prism that combines lights passed through the three liquid crystal light valves and a lens group and a mirror that guide the image light. Further, the projection optical system 23 may include a zoom mechanism and a mechanism for focus adjustment.

The video processing section 40 generates a video signal from a video source and outputs the video signal to the light-modulating-device driving section 28 according to the control by the control section 10.

When a video source selected by the control section 10 is a video signal input to the video I/F section 34, the video signal is input to the video processing section 40 from the video I/F section 34. When the video source selected by the control section 10 is video data stored in the storage medium 4 or the storing section 11 or video data input from the data output device 3, the video data is input to the video processing section 40 from the control section 10.

The control section 10 executes the control program 12 stored by the storing section 11, selects a video source of the projector 1 according to operation of the user received by the operation section 31, and causes the image forming section 20 to project (display) a video based on the selected video source.

When selecting the video supply device 2 as the video source, the control section 10 controls the video I/F section 34 and the video processing section 40 to execute processing of a video signal input from the video supply device 2 to the video I/F section 34. Consequently, the video signal is output from the video processing section 40 to the light-modulating-device driving section 28. A video corresponding to the video signal is projected by the image forming section 20.

When selecting, as the video source, video data output by the data output device 3, the control section 10 acquires the video data and outputs the video data to the video processing section 40. When selecting, as the video source, video data stored in the storage medium 4 or the video data 14 stored in the storing section 11, the control section 10 reads the video data and outputs the video data to the video processing section 40. In these cases, the control section 10 controls the video processing section 40 to process the video data and causes the image forming section 20 to project a video on the basis of the video data.

The control section 10 reads out, from the storing section 11, the mask data 15 to be combined with the video source and outputs the mask data 15 to the video processing section 40.

Figure 2:
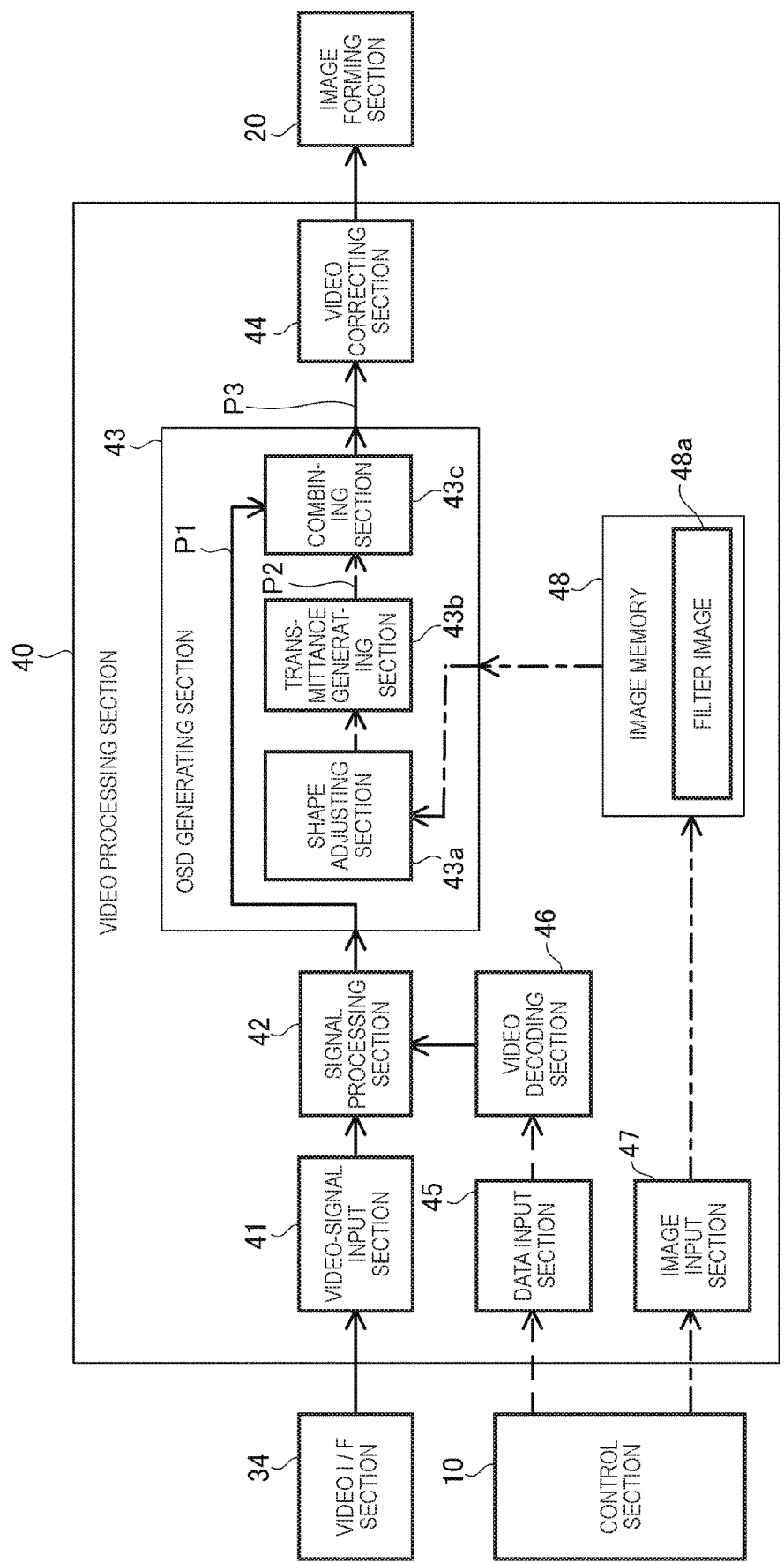
FIG. 2 is a block diagram of a video processing section included in the projector.

FIG. 2 is a block diagram showing the configuration of the video processing section 40. A solid line in FIG. 2 indicates a flow of a video signal, a broken line indicates video data, and an alternate long and short dash line indicates mask data explained below. Signs P1, P2, and P3 shown in FIG. 2 are explained below with reference to FIG. 3.

As shown in FIG. 2, the video processing section 40 includes a video-signal input section 41, a signal processing section 42, an OSD generating section 43, a video correcting section 44, a data input section 45, a video decoding section 46, an image input section 47, and an image memory 48. The video processing section 40 may be a circuit including hardware corresponding to the functional sections shown in FIG. 2 or may be a programmable device such as an IC or an FPGA obtained by integrating these circuits. For example, the video processing section 40 can also be realized by an IC including IP cores equivalent to the functional sections shown in FIG. 2. The video processing section 40 can be naturally configured by a plurality of devices. The video processing section 40 may include a processor that executes a computer program. The processor may execute the computer program and realize the functional sections shown in FIG. 2 through cooperation of software and hardware.

The video-signal input section 41, the signal processing section 42, the OSD generating section 43, and the video correcting section 44 included in the video processing section 40 may be connected to a frame memory (not shown in FIG. 2). In this case, the sections of the video processing section 40 expand, on the basis of a video signal, images forming one frame of a video in the frame memory and execute various kinds of processing. The frame memory may have a capacity capable of storing images equivalent to a plurality of frames. For example, the frame memory may be configured using, for example, a part of a storage region of the RAM included in the control section 10. A DRAM may be connected to the video processing section 40 via a memory bus or a DRAM controller not shown in FIG. 2 and caused to function as the frame memory.

The video-signal input section 41 executes, on a video signal input from the video I/F section 34, processing such as conversion into a signal format suitable for signal processing of the projector 1 and outputs the video signal to the signal processing section 42.

The signal processing section 42 executes, according to the control by the control section 10, on the video signal input from the video-signal input section 41, brightness conversion processing and color conversion processing for converting brightness and a color of a video into set states. The signal processing section 42 may execute noise removal processing for the video signal. The signal processing section 42 outputs the video signal after the processing to the OSD generating section 43.

The data input section 45 acquires video data input from the control section 10 and outputs the video data to the video decoding section 46. The video data input from the data input section 45 is video data that the control section 10 inputs to the video processing section 40 on the basis of video data of a file format. The video decoding section 46 decodes the video data input from the data input section 45, converts the video data into a video signal suitable for signal processing in the signal processing section 42, and outputs the video signal after the conversion to the signal processing section 42. For example, a video stream generated from video data of a file format is input to the video decoding section 46. Processing for generating the video stream from the video data of the file format may be executed by the control section 10 or may be executed by the data input section 45.

As explained above, the control section 10 outputs the mask data 15 to the video processing section 40. The mask data 15 is input to the image input section 47. The image input section 47 writes a filter image 48a in the image memory 48 on the basis of the mask data 15.

The image memory 48 is a temporary storage region in which the filter image 48a is temporarily stored. The image memory 48 is configured by a nonvolatile memory incorporated in the video processing section 40, a DRAM connected to the video processing section 40, or the like. The image memory 48 may be a part of the frame memory explained above or may be configured using a storage region of the same memory as the frame memory.

The OSD generating section 43 (an image generating section) performs processing for combining images. The OSD generating section 43 extracts images for one frame from the video signal input from the signal processing section 42 and sets the images as processing target images to be combined (images to be superimposed). The OSD generating section 43 superimposes an OSD image on the images to be superimposed. The OSD generating section 43 outputs a video signal of a combined image to the video correcting section 44.

The video correcting section 44 executes various kinds of correction processing such as geometric correction processing on the combined image output by the OSD generating section 43 and outputs the combined image to the image forming section 20 according to the control by the control section 10. Examples of the correction processing executed by the video correcting section 44 includes keystone correction and barrel-shaped distortion correction.

The OSD image is an image forming, for example, a menu screen for setting functions of the projector 1 and a message screen for informing an operation state of the projector 1. Image data of the OSD image may be stored in the storing section 11 in advance. The control section 10 may read out the OSD image stored in the storing section 11 and output the OSD image to the video processing section 40. The control section 10 may generate data of the OSD image according to a state of an input source of the projector 1, an error state, operation of the operation section 31, and the like and output the data of the OSD image to the video processing section 40. For example, the data of the OSD image is input to the image input section 47 and written in the image memory 48 by the image input section 47. The control section 10 controls the OSD generating section 43 to execute processing for superimposing the OSD image.

The OSD generating section 43 superimposes the OSD image on frames forming a video input from the signal processing section 42. The OSD generating section 43 may superimpose an image on all the frames of the input video or may superimpose the image on a part of the frames.

The OSD generating section 43 is also capable of superimposing the filter image 48a written in the image memory 48 on the frames of the video input from the signal processing section 42 and generating a combined image according to the control by the control section 10.

Figure 3:
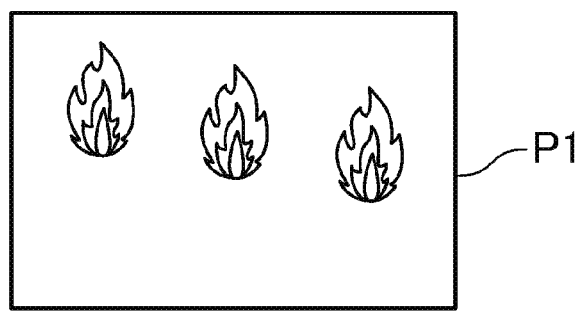
FIG. 3 is an explanatory diagram of processing in which the projector combines images.
Figure 3:
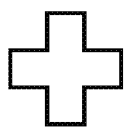
Figure 3:
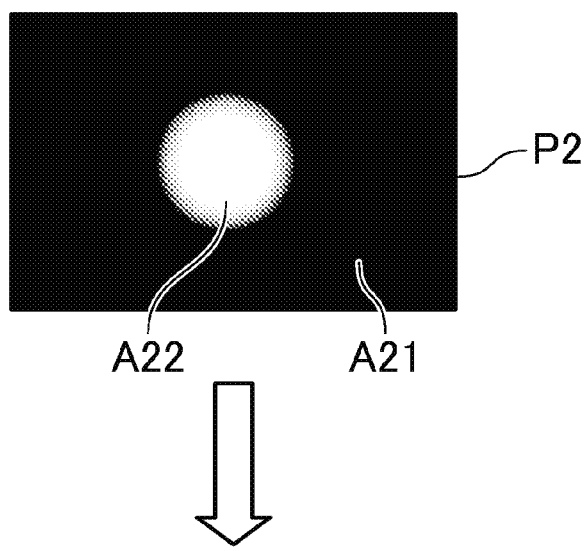
Figure 3:
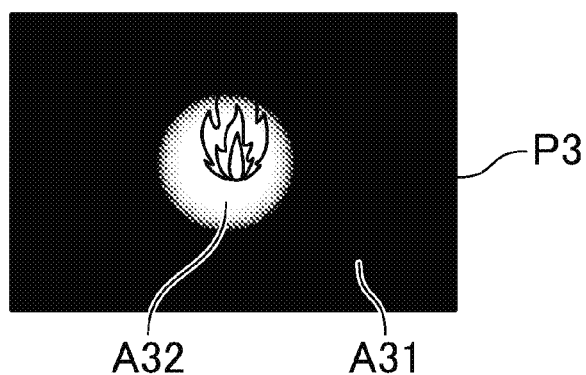

FIG. 3 is an explanatory diagram of processing in which the projector 1 combines images. The processing for combining images is executed by the OSD generating section 43.

A sign P1 indicates an example of an image generated on the basis of a video signal input to the OSD generating section 43. The image is referred to as original image P1. A sign P2 indicates an example of a filter image generated on the basis of the filter image 48a. A sign P3 indicates a combined image obtained by superimposing the filter image P2 on the original image P1. The original image P1 is equivalent to a first image. The video signal, on which the original image P1 is based, is equivalent to first image information.

All of the original image P1, the filter image P2, and the combined image P3 are images including a plurality of pixels. The original image P1 is, for example, an RGB 24-bit full color image. Data of the original image P1 includes gradation data of R, G, and B for each of the pixels.

The filter image P2 includes a plurality of regions having different transmittances. One pixel may form one region or a plurality of pixels may form one region. A position, a size, and a shape of the region is optional. Data of the filter image P2 includes transmittance for each of the regions. The transmittance means a degree of visibility of the original image P1 through the filter image P2 when the filter image P2 is superimposed on the original image P1. The transmittance can be called transparency as well. The filter image P2 is equivalent to a second image. Data of the filter image 48a, based on which the filter image P2 is generated, that is, mask data is equivalent to second image information.

The filter image P2 shown in FIG. 3 includes a region A21 and a region A22 in which different transmittances are set. The region A21 is a region in which the transmittance is set to 0%. The region A22 is a region in which the transmittance is set to 100%. The filter image P2 may be an image in which transmittance changes from 0% to 100% between pixels located in the boundary between the region A21 and the region A22. As illustrated in FIG. 3, the filter image P2 may be an image forming gradation in which the transmittance of a plurality of pixels located in the boundary between the region A21 and the region A22 changes stepwise from 100% to 0%. In this case, the transmittance is set to the pixels located in the boundary between the region A21 and the region A22 to form gradation.

The filter image P2 is transparent in the region (the region A22) where the transmittance is 100%. The filter image P2 is colored in a region where the transmittance is lower than 100%. A color of the coloring is optional. For example, the color may be black as shown in FIG. 3 or may be other colors. A plurality of colors may be arranged in the region where the transmittance is lower than 100% in one filter image P2.

The combined image P3 is an image obtained by superimposing the filter image P2 on the original image P1. A region A31 of the combined image P3 is a region overlapping the region A21 of the filter image P2. Because the transmittance of the region A21 is 0%, the region A31 of the combined image P3 is formed by pixels having the same color as a color of the region A21. On the other hand, in the combined image P3, the original image P1 is transmitted in the region where the transmittance is lower than 100% in the filter image P2. Therefore, in a region A32, a part of the original image P1 is transmitted through the region A22 and appears. The combined image P3 is equivalent to a third image.

The combined image P3 shown in FIG. 3 is in a state in which a part of the original image P1 is brightly visually recognized, the other part of the original image P1 is visually recognized dark, and a part of the original image P1 cannot be visually recognized. The combined image P3 has a visual effect as if a spotlight is irradiated on the original image P1. This visual effect is called illumination effect. The projector 1 can give the illumination effect to the original image P1 and project the original image P1 on the screen SC by superimposing the filter image P2, in which transmittance is set, on the original image P1.

As shown in FIG. 2, the OSD generating section 43 includes a shape adjusting section 43a, a transmittance generating section 43b, and a combining section 43c. FIG. 2 is a functional block diagram as explained above. The OSD generating section 43 may include hardware functioning as each of the shape adjusting section 43a, the transmittance generating section 43b, and the combining section 43c. Alternatively, the OSD generating section 43 may be configured to execute, in order shown in FIG. 2, processing corresponding to functions of the shape adjusting section 43a, the transmittance generating section 43b, and the combining section 43c. That is, functions and processing executed by the OSD generating section 43 may be schematically shown as the shape adjusting section 43a, the transmittance generating section 43b, and the combining section 43c. That is, the OSD generating section 43 only has to sequentially execute shape adjustment processing, transmittance generation processing, and combination processing.

The shape adjusting section 43a acquires the filter image 48a from the image memory 48 and performs processing for adjusting a shape and/or a size on the filter image 48a. In this processing, the shape adjusting section 43a adapts the shape and/or the size of the filter image 48a to the shape, the size, or the resolution of the light modulating device 22. A shape and a size (resolution) are adjusted by the signal processing section 42 in the video signal that the signal processing section 42 outputs to the OSD generating section 43. The shape adjusting section 43a adjusts the shape and/or the size of the filter image 48a to the video signal input from the signal processing section 42. Specifically, the shape adjusting section 43a matches the shape and/or the size of the filter image 48a to the shape and/or the size of the original image P1.

The transmittance generating section 43b generates the filter image P2 by converting luminance (referred to as luminance data or luminance information as well) of each of the pixels of the filter image 48a adjusted by the shape adjusting section 43a into transmittance. The filter image 48a is an image including a plurality of pixels and includes data of luminance of each of the pixels or a region formed by the plurality of pixels. For example, when the filter image 48a is an achromatic gray scale image, a gradation value of each of the pixels of the filter image 48a can be regarded as a gradation value of luminance. The number of bits of a gradation value of the filter image 48a is optional. The transmittance generating section 43b converts the gradation value of the filter image 48a into transmittance according to a conversion table or a conversion formula stored in the storing section 11 or another storing section (not shown in FIG. 1) in advance. The transmittance may be set to two stages of 0% and 100% or may be set to a plurality of stages (gradations) in a range of 0% or more and 100% or less. The transmittance may be represented by a percentage (%) that is 0% in a complete nontransparent state and is 100% in a transparent state or may be represented by a gradation value having a predetermined number of bits. Processing for converting the gradation value of the luminance of the filter image 48a into transmittance can be, for example, processing for directly replacing gradation of the luminance with gradation of the transmittance. There is an advantage that a processing load of the transmittance generating section 43b is light and a processing delay can be prevented or reduced. When the filter image 48a is a gray scale image, the filter image 48a has a gradation value of luminance and, on the other hand, does not have a gradation value of a color (color data). By combining the filter image P2 obtained from the filter image 48a with the original image P1, it is possible to give an illumination effect to the combined image P3 as if a filter for changing the luminance of the original image P1 for each of the pixels is applied.

The transmittance generating section 43b may convert a gradation value to transmittance for each of the pixels of the filter image 48a. The transmittance generating section 43b may divide the filter image 48a into a plurality of regions and set transmittance for each of the regions. In this case, the transmittance generating section 43b converts a gradation value of a color of a pixel included in each of the regions into transmittance of the region. This conversion processing is executed using, for example, the conversion table or the conversion formula stored in the storing section 11 or the other storing section (not shown in FIG. 1) in advance.

The transmittance generating section 43b may generate the filter image P2 by converting a gradation value of a color (which can be considered color data as well) of each of the pixels of the filter image 48a into transmittance. In this case, the filter image 48a can be a full color image or a monochrome image. Each of the pixels of the filter image 48a in this case has gradation values of three colors of R, G, and B or a gradation value of a monochrome. In this configuration, the transmittance generating section 43b converts the gradation value of the filter image 48a into transmittance according to the conversion table or the conversion formula stored in the storing section 11 or the other storing section (not shown in FIG. 1) in advance.

In this embodiment, an example is explained in which the transmittance generating section 43b convers, for each of the pixels, the gradation value of the luminance of each of the pixels of the filter image 48a, which is a gray scale image, into transmittance set stepwise in a range of 0% or more and 100% or less.

The combining section 43c superimposes the filter image P2 generated by the transmittance generating section 43b on the original image P1 input from the signal processing section 42 and combines the original image P1 and the filter image P2 to generate the combined image P3 and outputs the combined image P3 to the video correcting section 44. In this way, the projector 1 gives the illumination effect to the original image P1 with the OSD generating section 43 using the filter image 48a.

To realize a general OSD display function, the OSD generating section 43 is also capable of superimposing the OSD image such as the menu screen explained above on the original image P1 and displaying the OSD image. In this case, the control section 10 outputs image data of the OSD image to the image input section 47. The image input section 47 draws the OSD image in the image memory 48. When the OSD image such as the menu screen is processed, the shape adjusting section 43a acquires the OSD image from the image memory 48 and adjusts a size of the OSD image according to the size and the resolution of the original image P1. The transmittance generating section 43b directly outputs the OSD image to the combining section 43c without converting data of each of pixels of the OSD image into transmittance. The shape and the size of the OSD image do not have to coincide with the shape and the size of the original image P1.

Mask data input to the image input section 47 is not limited to the mask data 15 stored in the storing section 11. When mask data is stored in the storage medium 4, the control section 10 may cause the medium reading section 32 to read the mask data and may output the mask data to the video processing section 40. The control section 10 may acquire mask data input from the data output device 3 to the I/F section 33 and output the mask data to the video processing section 40. The control section 10 may generate mask data according to operation received by the operation section 31. These mask data are input to the image input section 47 by the control section 10 like the mask data 15.

The mask data 15 and the mask data input to the video processing section 40 by the other methods are data of the filter image 48a explained above and are gray scale image data. For example, processing for converting color data of full color image data into luminance data may be performed by an external device such as a personal computer to generate mask data, which is a gray scale image. The mask data may be full color image data, monochrome image (binary) data, or the like.

The video processing section 40 executes, with the signal processing section 42, signal processing for a video signal and executes, with the OSD generating section 43, video processing for giving the illumination effect. In this way, the video processing concerning the original image P1 is executed by a processing section (the signal processing section 42) different from the OSD generating section 43. Therefore, there is an advantage that it is possible to process the video signal without being affected by the illumination effect.

Figure 4:
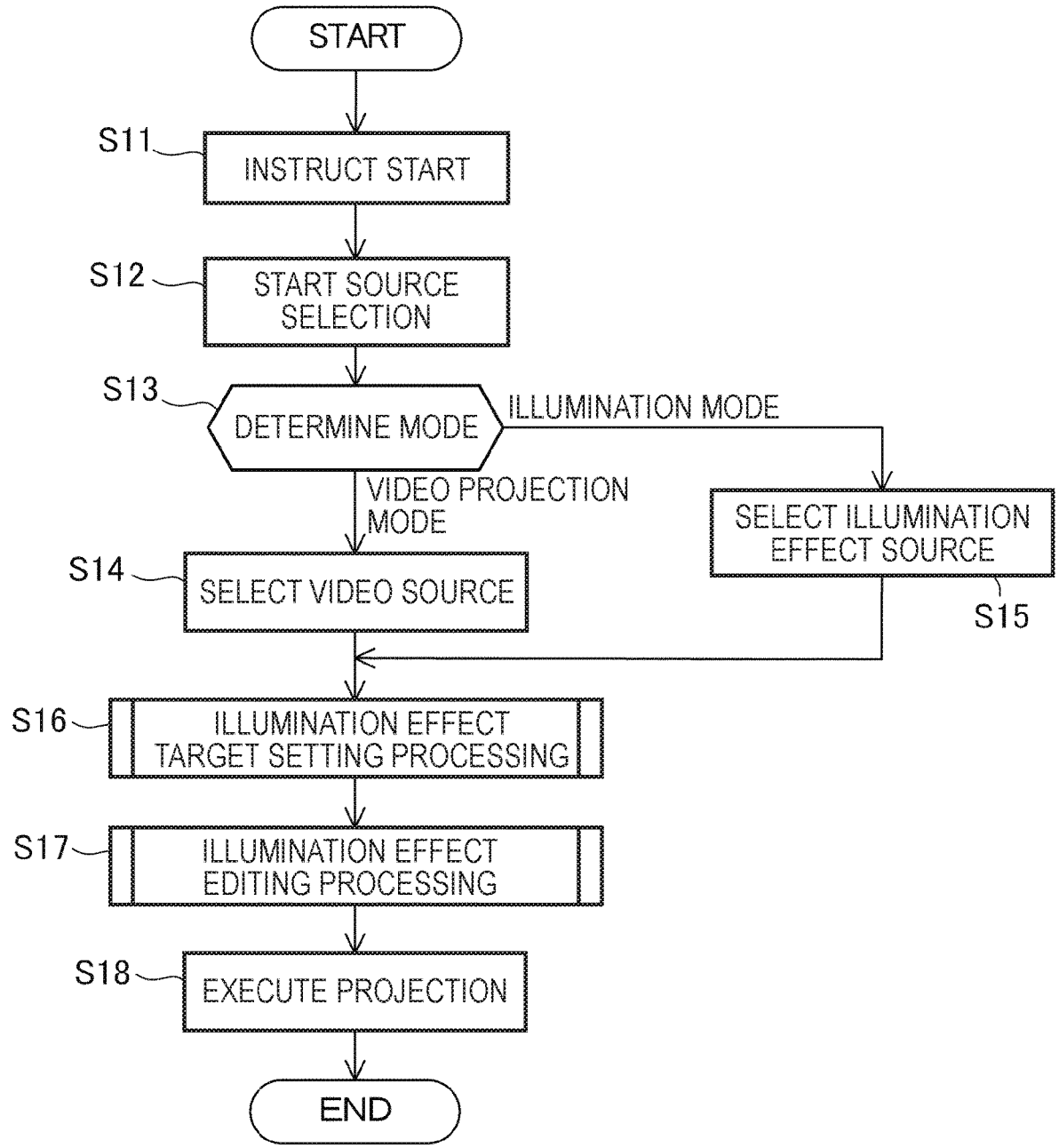
FIG. 4 is a flowchart for explaining the operation of the projector.

FIG. 4 is a flowchart for explaining the operation of the projector 1.

When a start of video projection that makes use of the illumination effect is instructed by the operation section 31 (step S11), the control section 10 starts selection of a video source (step S12).

The control section 10 determines an operation mode of the projector 1 (step S13). The operation mode of the projector 1 can be selected from a video projection mode for projecting, onto the screen SC, a combined image obtained by superimposing a filter image on the video source and an illumination mode for projecting the filter image onto the screen SC. The illumination mode is an operation mode for projecting, with the projector 1, illumination light having a shape of the filter image P2 (FIG. 3). In the illumination mode, the projector 1 can be caused to function as a kind of an illumination device. The operation mode of the projector 1 can be set by input operation by the operation section 31 and may be set in default (an initial state). When a video source usable by the projector 1 is absent, the control section 10 may automatically select the illumination mode.

When the operation mode is the video projection mode (video projection mode in step S13), the control section 10 selects a video source from the storing section 11, the data output device 3, and the storage medium 4 (step S14). The control section 10 may automatically select the video source, for example, according to a preset selection rule. The selection rule is, for example, a rule for designating priority order of the selection of the storing section 11, the data output device 3, and the storage medium 4 or a rule for associating an operation state of the projector 1 and a video source to be selected. In this case, for example, data indicating the selection rule is included in the setting data 13 and stored. The control section 10 may select the video source according to an input of the operation section 31.

When the operation mode is the illumination mode (illumination mode in step S13), the control section 10 selects an illumination effect source as the video source (step S15). The illumination effect source is mask data and is the mask data 15 or mask data obtained from the data output device 3 or the storage medium 4. In the illumination mode, the video source is absent. Therefore, a video signal of the original image P1 with which the filter image P2 is combined is absent. However, the mask data is treated as a source. Consequently, it is possible to treat the illumination effect in the same manner as when a video source to be projected is present.

In step S15, when there are a plurality of usable mask data, mask data to be used among the plurality of mask data may be selectable by the operation section 31.

Figure 5:
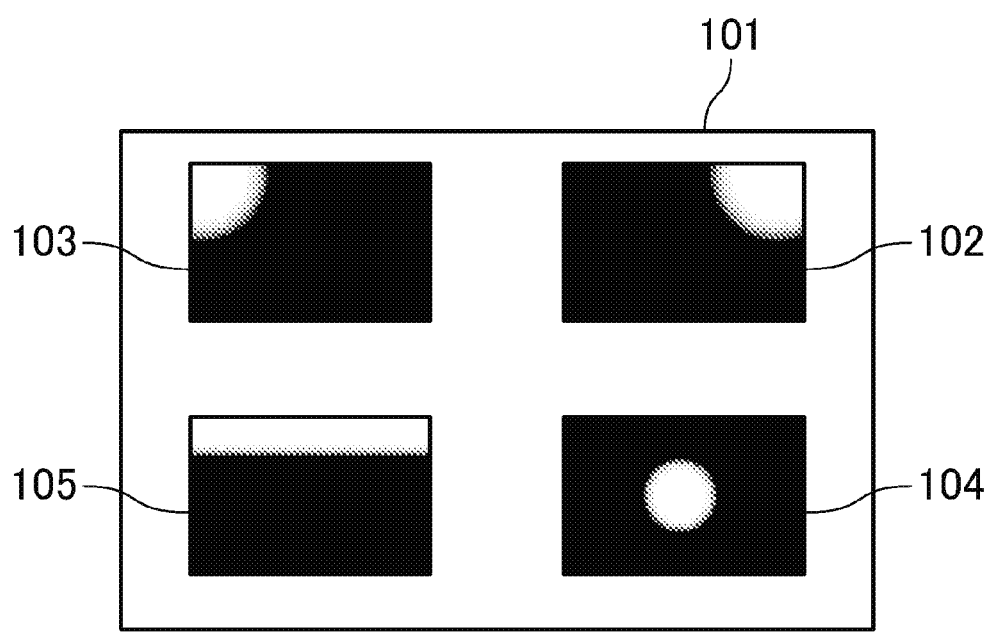
FIG. 5 is a diagram showing an example of a projection image of the projector.

FIG. 5 is a diagram showing an example of the projection image PP projected (displayed) by the projector 1. A selection screen 101 for selecting mask data is shown in FIG. 5.

Mask data usable in the projector 1 is displayed as a list on the selection screen 101. In the example shown in FIG. 5, four mask images 102, 103, 104, and 105 having different luminance distributions are arranged on the selection screen 101. The mask images 102, 103, 104, and 105 are respectively images to be projected based on mask data, which is gray scale image data.

The user can select, by performing input operation with the operation section 31, a mask image to be used out of the mask images 102, 103, 104, and 105 arranged on the selection screen 101.

In this case, the mask image based on the mask data can be selected as an illumination effect source. Therefore, the user can perform operation of the illumination mode like the operation for selecting a video source. Therefore, because an operation feeling is similar even if the operation mode is different, the user can perform the operation without hesitation.

Referring back to FIG. 4, the control section 10 executes illumination effect target setting processing for setting a target to which the illumination effect is applied (step S16) reflecting the selection in step S14 or S15. Further, the control section 10 performs illumination effect editing processing for editing the illumination effect (step S17) and projects the projection image PP on the screen SC reflecting results of these kinds of processing (step S18).

Figure 6:
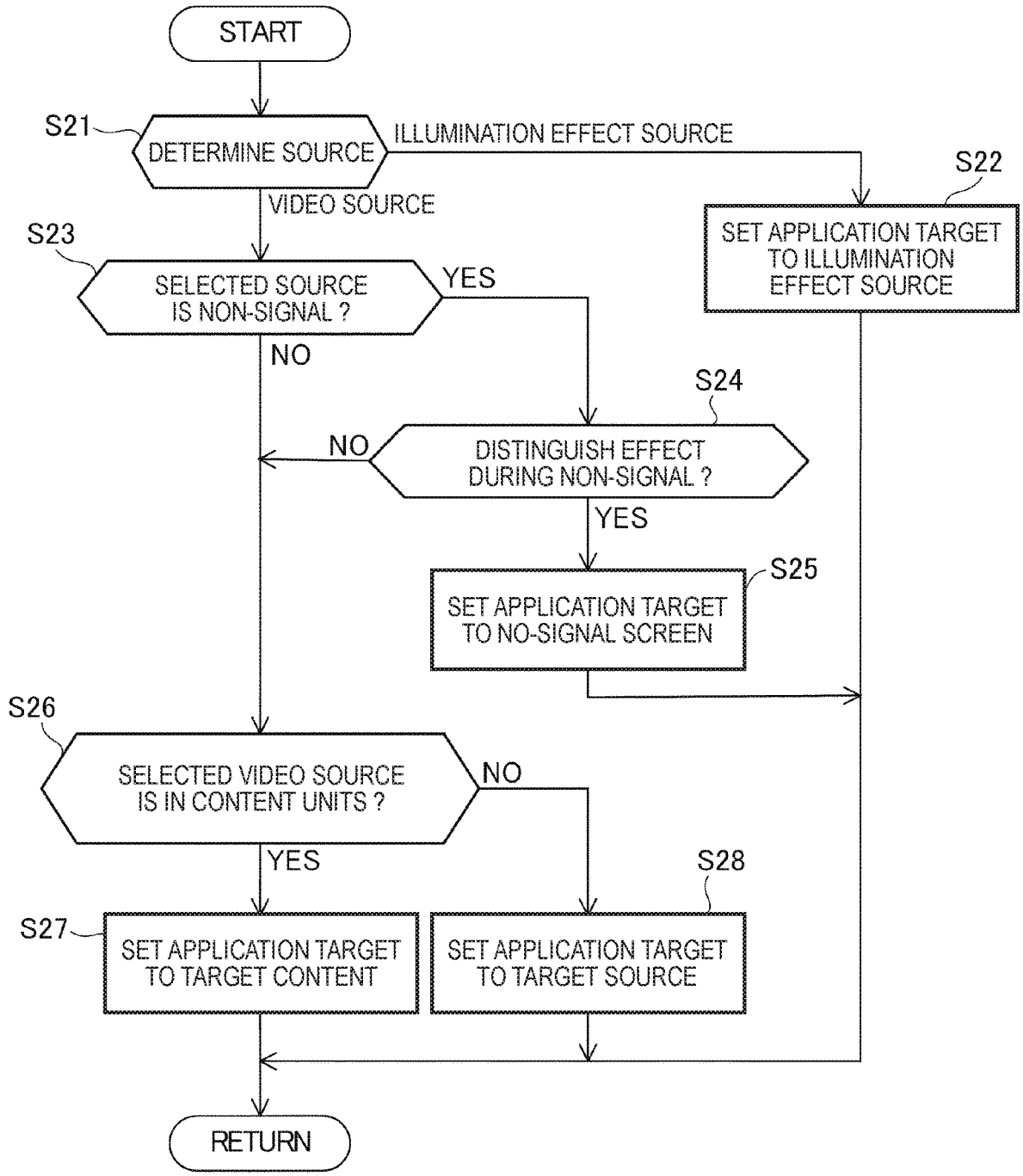
FIG. 6 is a flowchart for explaining the operation of the projector.

FIG. 6 is a flowchart for explaining the operation of the projector 1 and is a flowchart for explaining the illumination effect target setting processing (step S16 in FIG. 4) in detail.

The control section 10 determines whether the selected source is a video source or an illumination effect source (step S21). When the selected source is the illumination effect source (illumination effect source in step S21), the control section 10 sets an application target to the illumination effect source (step S22) and returns to the operation shown in FIG. 4.

When the selected source is the video source (video source in step S21), the control section 10 determines whether the selected video source is a non-signal (step S23). For example, when the video I/F section 34 is selected as the video source and a video signal input to the video I/F section 34 is absent, the control section 10 determines that the selected video source is a non-signal (YES in step S23). When the video source is the non-signal, the control section 10 determines whether the illumination effect is set to be distinguished during the non-signal (step S24). This setting is performed by, for example, operation of the operation section 31 beforehand. Setting content is included in the setting data and stored. When the illumination effect during the non-signal is set to be distinguished (YES in step S24), the control section 10 sets the application target of the illumination effect to a non-signal screen (step S25) and returns to the operation shown in FIG. 4.

When the video signal of the selected source is present (NO in step S23) and when the illumination effect during the non-signal is set not to be distinguished (NO in step S24), the control section 10 shifts to step S26. In step S26, the control section 10 determines whether the selected video source is in content units (step S26). When the video source is in content units, an output of the video signal and information (a content ID and a content name) concerning content are associated with each other. For example, the data output device 3 such as a media player reproduces a file on the basis of the content name or the content ID and outputs the video signal. The control section 10 reproduces, in content units, the video data 14 stored in the storing section 11 or the video file stored in the storage medium 4. In these cases, the control section 10 determines that the video source is in content units (YES in step S26). The control section 10 cannot distinguish the video signal for each content, for example, when the video signal is input from the HDMI interface or the D-Sub connector of the video I/F section 34.

When determining that the video source is in content units (YES in step S26), the control section 10 sets the application target to target content (step S27) and returns to the operation shown in FIG. 4. When determining that the video source is not in content units (NO in step S26), the control section 10 sets the application target to the target source (step S28) and returns to the operation in FIG. 4.

The application target is a target of control for executing processing in which the control section 10 gives the illumination effect using the mask data and stopping the processing. When the application target is set to content (step S27), the control section 10 gives the illumination effect according to reproduction start and stop of the content. The control section 10 performs control for, for example, using mask data set in association with the content or stopping processing for superimposing the filter image P2 based on the mask data when reproduction of the content is completed. In this case, the original image P1 is a video signal of content input from the video supply device 2 to the video I/F section 34 or a video signal based on video data acquired by the control section 10 from the data output device 3 or the storage medium 4 and input to the data input section 45.

When the application target is set to the video source (step S28), the control section 10 gives the illumination effect according to a state of the video source. The control section 10 performs control to, for example, start and stop processing for superimposing the filter image P2 based on the mask data according to a start and an end of the operation of the video supply device 2, which is the video source.

When the application target is set to the non-signal screen (step S25), the control section 10 performs processing for giving the illumination effect to the non-signal screen. In this case, for example, when the video signal is input, the control section 10 stops the processing for superimposing the filter image P2 based on the mask data or stops the projection of the combined image P3. In this case, the original image P1 is video information in a non-signal state and is a blank image.

When the application target is set to the illumination effect source (step S22), the control section 10 can project the combined image P3 irrespective of an input state or the like of the video signal. In this case, because the original image P1 is absent, the original image P1 is a blank image in the same manner as when the application target is set to the non-signal screen.

Figure 7:
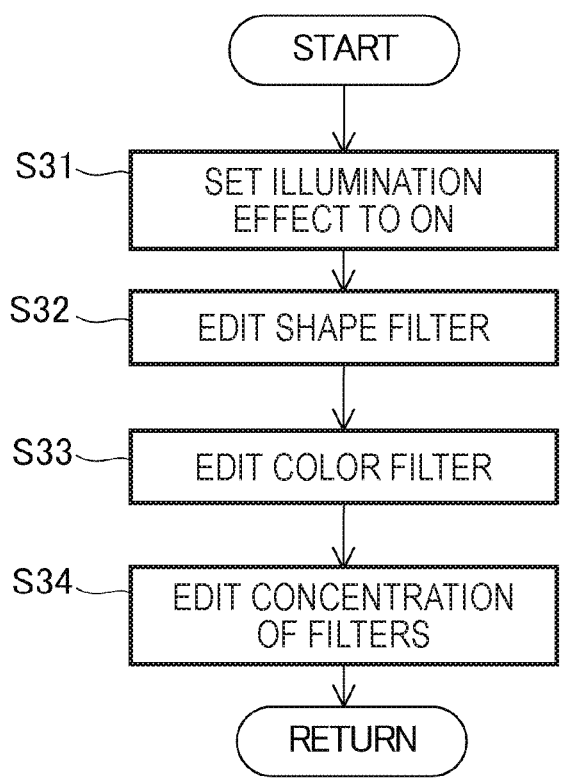
FIG. 7 is a flowchart for explaining the operation of the projector.

FIG. 7 is a flowchart for explaining the operation of the projector 1 and is a flowchart for explaining the illumination effect editing processing (step S17 in FIG. 4) in detail.

The control section 10 sets the illumination effect to ON (step S31) and applies the illumination effect to a target video. The illumination effect applied in step S31 is an effect based on a preset mask image such that editing content is easily grasped during editing. That is, the combined image P3 obtained by superimposing the filter image P2 based on preset mask data on the blank image is projected. When an instruction for stopping the illumination effect is input by the operation section 31, the control section 10 may set the illumination effect to OFF.

The control section 10 sequentially executes editing of a shape filter (step S32), editing of a color filter (step S33), and editing of the concentration of the filters (step S34).

In the processing for editing the shape filter (step S32), the control section 10 performs editing of setting concerning a shape of the illumination effect. For example, a type of a region where transmittance is changed in the filter image P2 is selected from a circle, a square, any figure, and the like or created according to operation of the operation section 31. The processing in step S32 includes processing for setting filter attributes of the illumination effect. The filter attributes indicate a position and a form in which the illumination effect is given to the original image P1 by superimposing the filter image P2 on the original image P1.

In the processing for editing the shape filter (step S32), the control section 10 may be capable of editing setting of a position and a size used in the illumination effect in the mask data.

Figure 8:
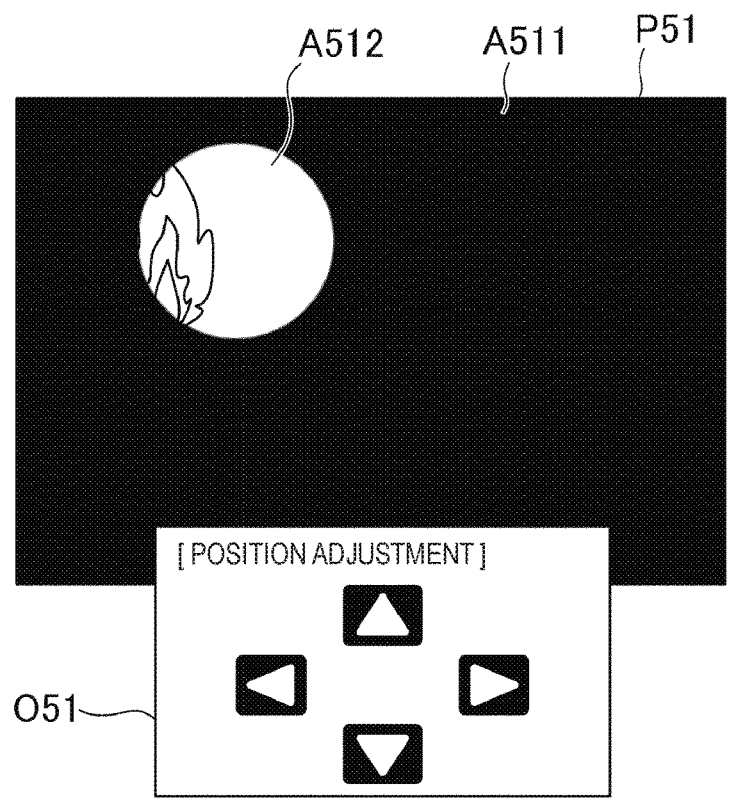
FIG. 8 is a diagram showing an example of a projection image of the projector.

FIG. 8 is a diagram showing an example of a projection image of the projector 1 and is an example of a screen on which setting of a position used for the illumination effect in the mask data.

On the projection image shown in FIG. 8, a combined image P51 and an OSD image O51 for editing the combined image P51 are arranged. The combined image P51 is an image obtained by superimposing a filter image selected by operation of the operation section 31 on the original image P1. The combined image P51 includes a nontransparent region A511 (e.g., transmittance is 0%) and a region A512 having high transmittance (e.g., transmittance is 100%). A color of the region A511 is, for example, solid black.

The control section 10 edits the filter image according to operation of the operation section 31 in a state in which the projection image shown in FIG. 8 is displayed. Specifically, the control section 10 edits, according to the operation of the operation section 31, data of the filter image 48a stored in the image memory 48. Icons corresponding to upward, downward, right, and left direction keys provided in a remote control device are arranged on the OSD image O51 illustrated in FIG. 8. The control section 10 detects operation on a direction key of the remote control device or an icon of the OSD image O51. For example, when information indicating that the left direction key is pressed is input to the operation section 31, the control section 10 moves the region A512 according to the left direction key. The control section 10 edits the data of the filter image 48a such that the region A512 moves to the left as a whole.

Figure 9:
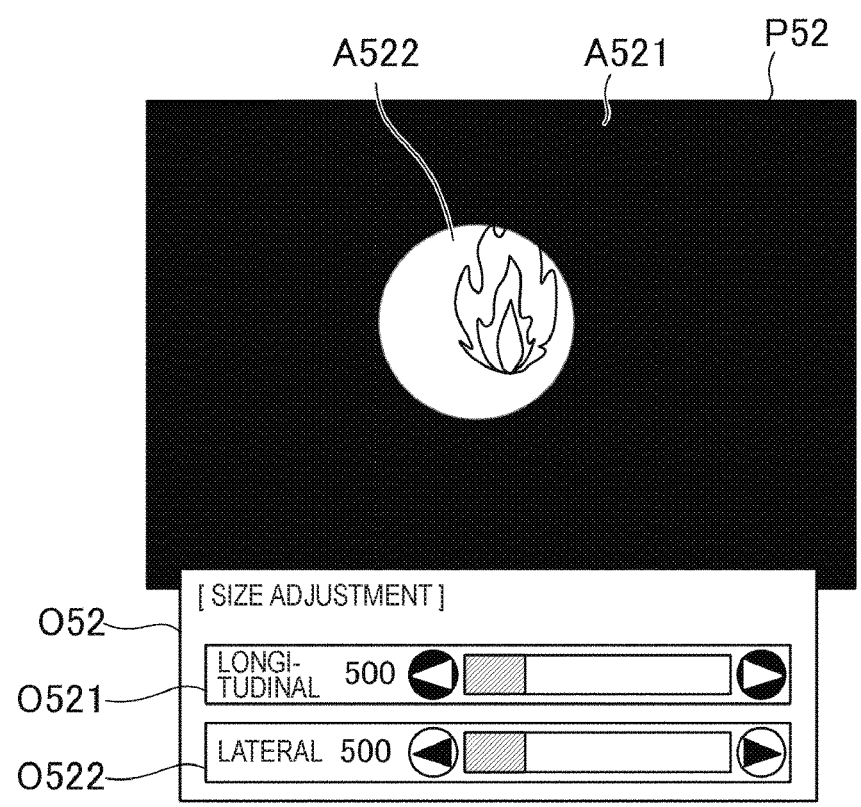
FIG. 9 is a diagram showing an example of a projection image of the projector.

FIG. 9 is a diagram showing an example of a projection image of the projector 1 and is an example of a screen for performing setting of magnitude of the illumination effect in the mask data.

On the projection image shown in FIG. 9, a combined image P52 and an OSD image O52 for editing the combined image 52 are arranged. In the example shown in FIG. 9, the OSD image O52 includes an OSD image 521 for changing a size in the longitudinal direction and an OSD image O522 for changing a size in the lateral direction.

The combined image P52 is an image obtained by superimposing a filter image selected by operation of the operation section 31 on the original image P1. The combined image P52 includes a nontransparent region A521 (e.g., transmittance is 0%) and a region A522 having high transmittance (e.g., transmittance is 100%). A color of the region A521 is, for example, solid black.

The control section 10 edits the filter image according to operation of the operation section 31 in a state in which the projection image shown in FIG. 9 is displayed. Specifically, the control section 10 edits, according to the operation of the operation section 31, the data of the filter image 48a stored in the image memory 48. Icons corresponding to right and left direction keys provided in a remote control device are arranged on the OSD image O521 illustrated in FIG. 9. The control section 10 detects operation on a direction key of the remote control device or an icon of the OSD image O521 as size adjusting operation in the longitudinal direction. Similarly, icons corresponding to the right and left direction keys provided in the remote control device are arranged on the OSD image O522. The control section 10 detects operation on a direction key of the remote control device or an icon of the OSD image O522 as size adjusting operation in the lateral direction.

For example, in a state in which the OSD image O521 is selected, when information indicating that the left direction key provided in the remote control device is pressed is input to the operation section 31, the control section 10 changes a size in the longitudinal direction of the region A522 according to operation of the left direction key. The control section 10 edits the data of the filter image 48a such that the region A522 decreases in size in the longitudinal direction. Similarly, for example, in a state in which the OSD image O522 is selected, when information indicating that the left direction key provided in the remote control device is pressed is input to the operation section 31, the control section 10 changes a size in the lateral direction of the region A522 according to operation of the left direction key. The control section 10 edits the data of the filter image 48a such that the region A522 decreases in size in the lateral direction.

Note that, as illustrated in FIGS. 8 and 9, the combined images P51 and P52 are used on the screen for setting the position and/or the size used in the illumination effect in the mask data. However, a filter image may be displayed instead of the combined images P51 and P52. When the combined image P51 and P52 are displayed to edit the filter image, there is an advantage that it is possible to edit the filter image while confirming a state of the combined images. When the filter image is displayed to perform the editing, there is an advantage that a processing load on the control section 10 is reduced. The control section 10 may edit, according to operation of the operation section 31, the mask data 15 stored in the storing section 11 instead of processing for editing the filter image 48a of the image memory 48 as explained above.

The control section 10 edits setting of a color filter. The color filter is setting related to a color of a filter image generated on the basis of the mask data. More specifically, a color of a region where transmittance is not 100% in the filter image is set. The color can be, for example, a color (red, blue, green, etc.) fixed in advance, a color having an effect of simulatively reproducing a color equivalent to illumination (a light bulb or a fluorescent lamp), or a custom color optionally designated by the user.

Figure 10:
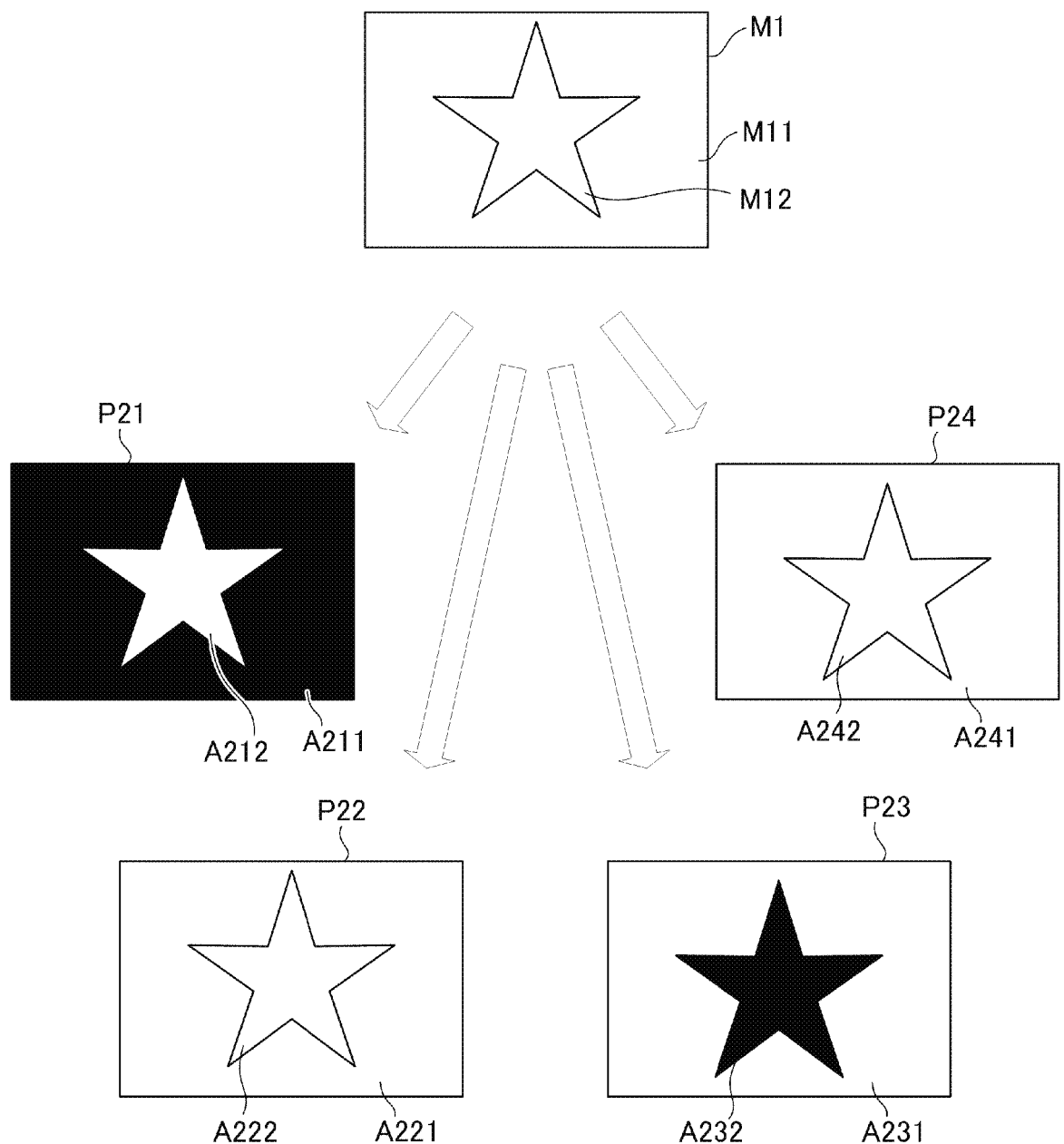
FIG. 10 is an explanatory diagram of the operation of the projector.

FIG. 10 is an explanatory diagram of the operation of the projector 1. In FIG. 10, setting of filter attributes and variations of a color filter are shown.

In FIG. 10, mask data M1 and filter images P21, P22, P23, and P24 that can be generated on the basis of the mask data M1 are shown.

The mask data M1 is an example of the mask data 15, mask data input from the data output device 3 or the storage medium 4, or mask data generated by the control section 10. The mask data M1 includes a plurality of regions M11 and M12 having different levels of luminance. For example, the luminance of a pixel included in the region M11 is higher than the luminance of a pixel included in the region M12.

Filter images P21, P22, P23, and P24 are filter images generated by the transmittance generating section 43b on the basis of the mask data M1. The filter images P21, P22, P23, and P24 have filter attributes different from one another.

The filter image P21 includes a nontransparent region A211 (e.g., transmittance is 0%) and a region A212 having high transmittance (e.g., transmittance is 100%). A color of the region A211 is, for example, solid black. The filter image P22 includes a nontransparent region A221 (e.g., transmittance is 0%) and a region A222 having high transmittance (e.g., transmittance is 100%). A color of the region A221 is, for example, solid white. The colors of the regions A211 and A221 are determined according to setting of the color filter.

The filter image P23 includes a region A231 having high transmittance (e.g., transmittance is 100%) and a nontransparent region A232 (e.g., transmittance is 0%). A color of the region A232 is, for example, solid black. The filter image P24 includes a region A241 having high transmittance (e.g., transmittance is 100%) and a nontransparent region A242 (e.g., transmittance is 0%). A color of the region A242 is, for example, solid white. The colors of the regions A232 and A242 are determined according to setting of the color filter.

Figure 11:
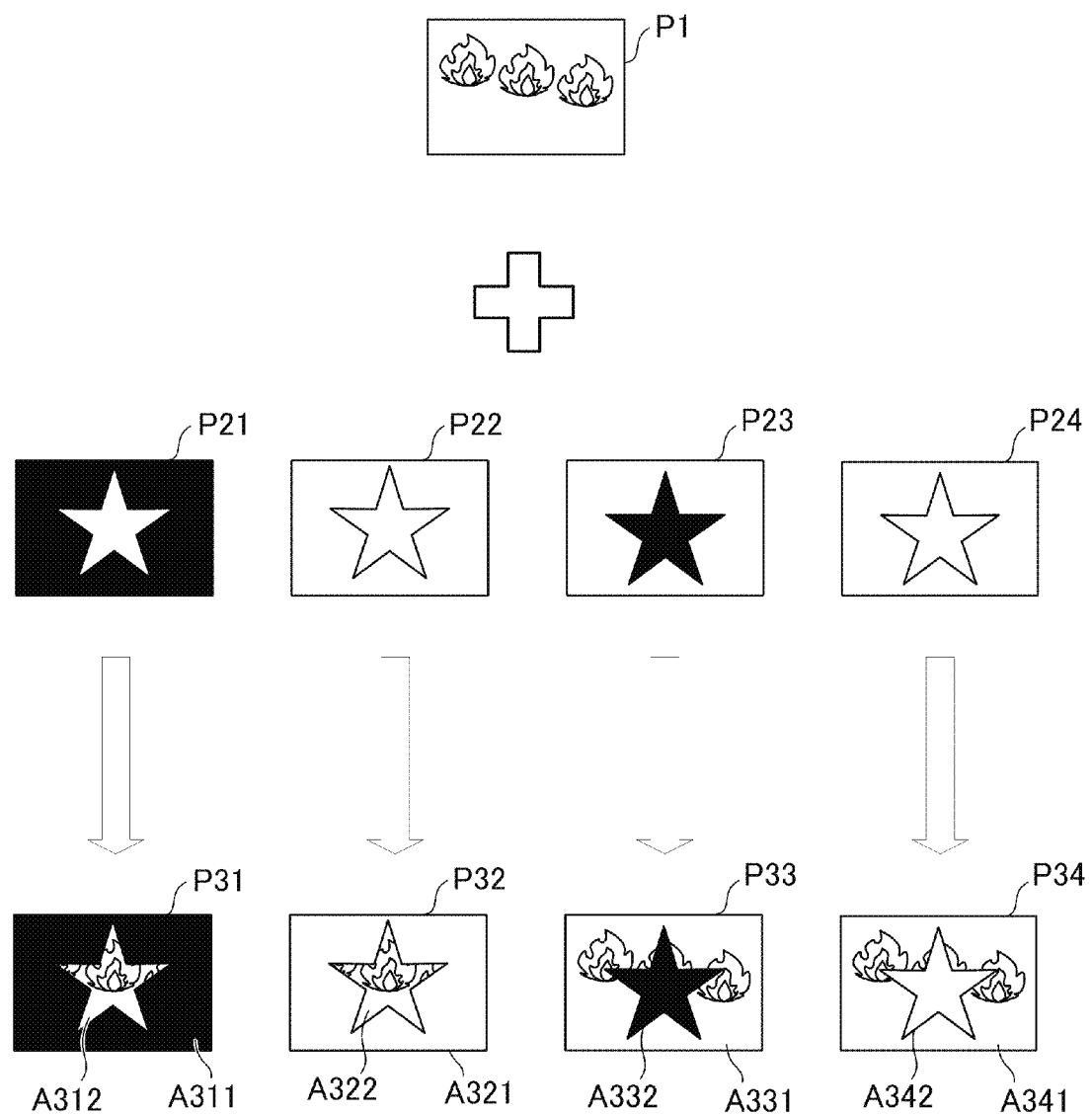
FIG. 11 is an explanatory diagram of the operation of the projector.

FIG. 11 is an explanatory diagram of the operation of the projector 1. An example is shown in which the filter images P21, P22, P23, and P24 shown in FIG. 10 are applied to video data.

In FIG. 11, a target on which the OSD generating section 43 superimposes the filter images P21, P22, P23, and 24 is indicated by the original image P1.

In a combined image P31 obtained by superimposing the filter image P21 on the original image P1, the original image P1 is transmitted in a region A312 corresponding to the region A212 (FIG. 10). The combined image P31 having a single color of black is projected in a region A311. In a combined image P32 obtained by superimposing the filter image P22 on the original image P1, the original image P1 is transmitted in a region A322 corresponding to the region A222 (FIG. 10). The combined image P32 having a single color of white is projected in a region A321.

On the other hand, in a combined image P33 obtained by superimposing the filter image P23 on the original image P1, the original image P1 is transmitted in a region A331. The combined image P33 having a single color of black is projected in a region A332 corresponding to the region A232 (FIG. 10). In a combined image P34 obtained by superimposing the filter image P24 on the original image P1, the original image P1 is transmitted in a region A341. The combined image P34 having a single color of white is projected in a region A342 corresponding to the region A242 (FIG. 10).

In this way, by setting or changing the filter attributes and the color filter, it is possible to generate, from one mask data M1, the filter images P21, P22, P23, and P24 that produce different illumination effects. The setting concerning the filter attributes and the color filter is used by the control section 10 in processing in which the OSD generating section 43 converts the luminance of the filter image 48a into transmittance. That is, in processing in which the transmittance generating section 43b converts the luminance of the filter image 48a into transmittance, the control section 10 designates, according to the setting of the filter attributes, correspondence between a level of luminance and a level of transmittance and a color of a region where transmittance is low.

In processing for editing the concentration (the density) of the filter (step S34), the control section 10 edits setting of concentration at the time when the filter image P2 is superimposed on the original image P1. Transmittance is set in the filter image P2. However, in addition to the transmittance for each of the regions or each of the pixels in the filter image P2, the transmittance of the entire filter image P2 can be set as concentration. The concentration to be set may be any value designated by operation of the operation section 31 or may be selected from patterns prepared in advance.

Concerning the items set in steps S32 to S34, the setting data 13 may include initial setting values. The control section 10 may be capable of performing processing using the initial setting values when the setting is not performed. Order of performing the editing insteps S32, S33, and S34 is not limited.

As explained above, the projector 1 according to the embodiment applied with the invention includes the OSD generating section 43. The OSD generating section 43 combines, on the basis of transmittance, the first image (the original image P1) based on the video source, which is the first image information, and the second image (the filter image P2) generated by converting the luminance information of the second image information (the mask data) including the luminance information into the transmittance. According to this processing, the OSD generating section 43 generates the third image (the combined image P3). The projector 1 includes the image forming section 20 that displays the third image (the combined image P3) generated by the OSD generating section 43.

With the display device and the projector 1 applied with the control method for the display device of the invention, it is possible to combine the filter image P2 with the original image P1 at transmittance set by reflecting the luminance information and project the combined image P3. Consequently, it is possible to give new gradation expression to the original image P1 by using the filter image P2 having the gradation of the transmittance generated, for example, on the basis of the mask data including the luminance information subjected to gradation expression.

It is possible to give a change of expression by a position and a shape in an image to the original image P1 by combining, with the original image P1, the filter image P2 generated on the basis of the mask data having a difference in the luminance information in the image. In this way, it is possible to give rich expressive effect to the original image P1 and display the original image P1 by combining, with the original image P1, the filter image P2 in which the luminance information of the mask data is converted into the transmittance.

The original image P1 includes a plurality of pixels. The mask data includes luminance information for each of regions including a plurality of pixels or each of the pixels. The OSD generating section 43 combines, on the basis of the mask data, with the original image P1, the filter image P2 including a plurality of pixels and having transmittance for each of regions including a plurality of pixels or each of the pixels and generates the combined image P3. Consequently, the filter image P2 is combined with the original image P1 according to transmittance obtained by converting the luminance information for each of the regions or each of the pixels. Consequently, the combined image P3 is an image obtained by giving a change for each of the regions or each of the pixels to the original image P1. It is possible to display the original image P1 in a rich expressive form.

The projector 1 causes the image forming section 20 to project the selection screen 101 including images for selection (e.g., the mask images 102, 103, 104, and 105) corresponding to a respective plurality of mask data. The projector 1 includes the control section 10 that causes the OSD generating section 43 to process mask data corresponding to an image for selection selected from a plurality of images for selection. Consequently, mask data selected from the plurality of mask data can be combined with the original image P1. Therefore, it is possible to give a variety of effects to the original image P1.

The control section 10 adjusts a form for combining, with the original image P1, the filter image P2 generated from the mask data corresponding to the selected image for selection. Specifically, the control section 10 edits the filter attributes and the color filter with the illumination effect editing processing (FIG. 7). Consequently, it is possible to give richer expressive effect to the original image P1 and display the original image P1.

The control section 10 may edit, with the illumination effect editing processing, a position of a range combined with the original image P1 in the filter image P2, a size of the range combined with the original image P1 in the filter image P2, and the like. The control section 10 may edit, with the illumination effect editing processing, a shape of the range combined with the original image P1 in the filter image P2, a color of the filter image P2, concentration in combining the filter image P2 with the original image P1, and the like. The control section 10 may adjust at least one or more of the above. Consequently, it is possible to change an effect given to the original image P1 using one filter image P2. It is possible to give a variety of effects to the original image P1.

The control section 10 may select, from a selectable plurality of conversion systems, a conversion system for converting the luminance information of the mask data into transmittance. Specifically, the control section 10 converts, in a conversion system matching the setting edited by the luminance effect editing processing, with the OSD generating section 43, the luminance information into transmittance to generate the filter image P2 and combines the filter image P2 with the original image P1. Consequently, it is possible to change an effect given to the original image P1 using the mask data. It is possible to give a variety of effects to the original image P1.

The image for selection is an achromatic gray scale image generated from the mask data. Consequently, the luminance of the mask data is clearly reflected on the image for selection. Therefore, it is possible to satisfactorily grasp, with the image for selection, transmittance in combining the filter image P2 with the original image P1. Therefore, an effect given to the original image P1 is easily known. It is possible to easily select the mask data.

The image for selection is the filter image P2 generated from the mask data. Therefore, an effect given to the original image P1 by the mask data is easily known. It is possible to easily select the mask data.

Second Embodiment

Figure 12:
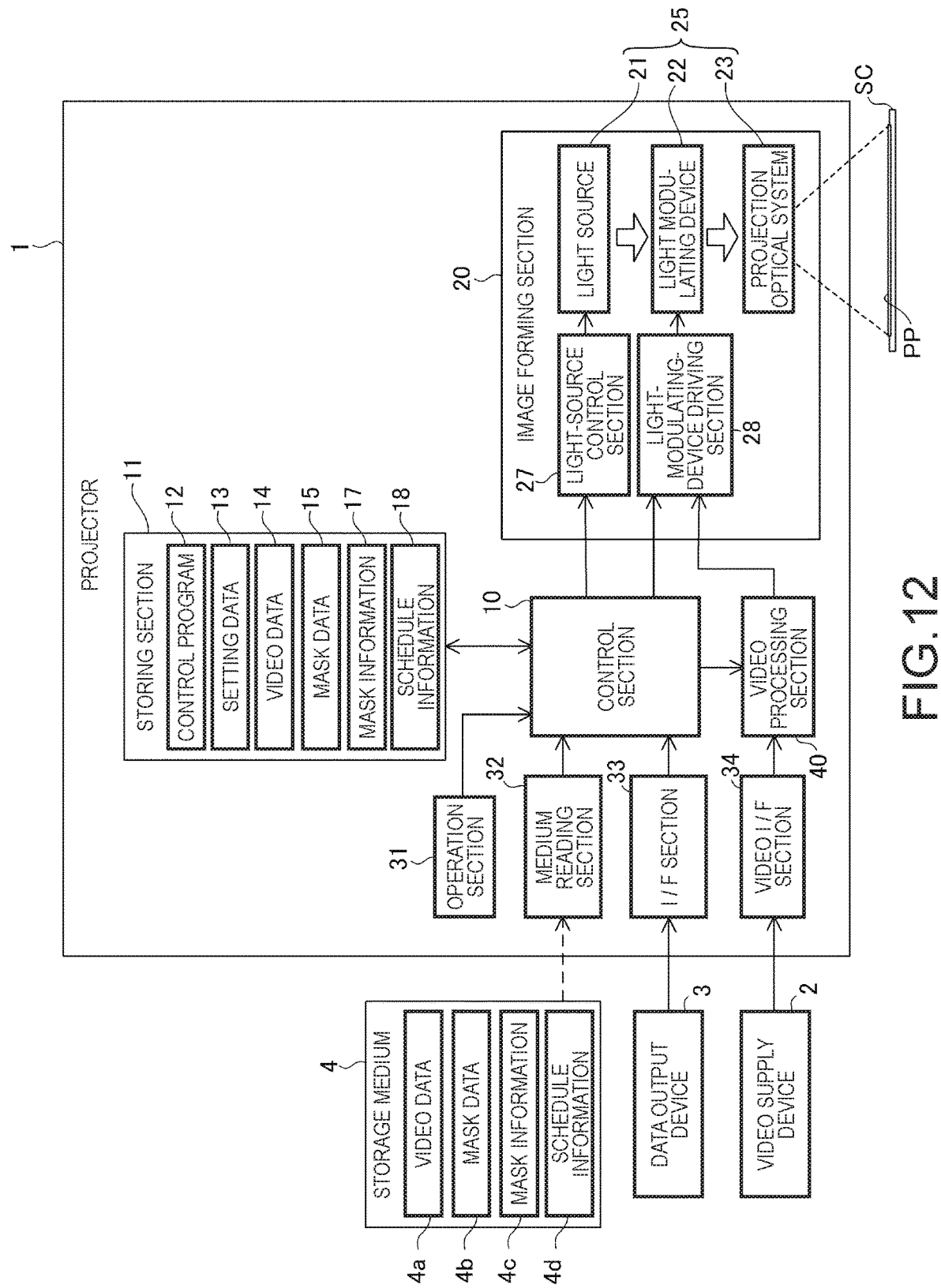
FIG. 12 is a block diagram of a projector in a second embodiment.

FIG. 12 is a block diagram of the projector 1 in a second embodiment.

In the second embodiment, the configuration of the projector 1 is common to the first embodiment. In the second embodiment, mask information and schedule information are stored in the storage medium 4 and/or the storing section 11. The control section 10 controls the video processing section 40 on the basis of these kinds of information.

For example, the storage medium 4 stores the video data 4a and the mask data 4b, which are files of video contents. Further, the storage medium 4 stores mask information 4c and schedule information 4d. The mask information 4c is data associated with the video data 4a and the mask data 4b and is data for designating the mask data 4b processed by the OSD generating section 43 in combination with the video data 4a.

Figure 13:
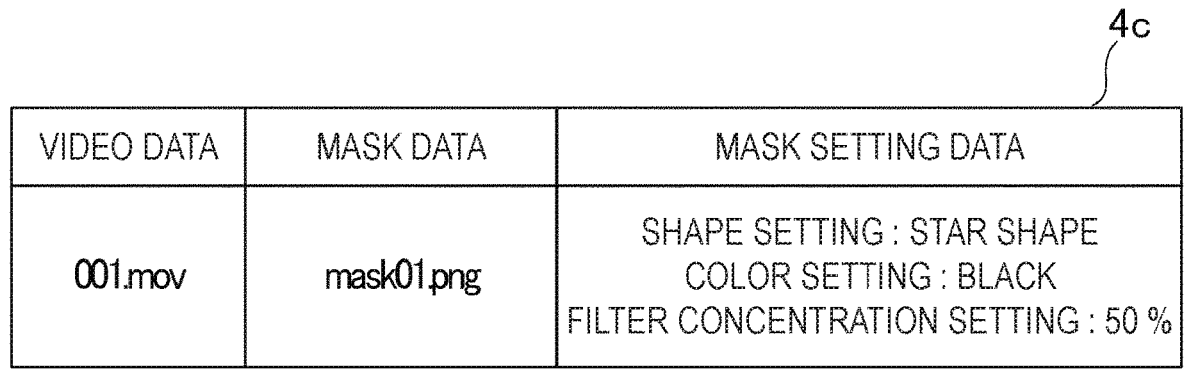
FIG. 13 is a schematic diagram showing a configuration example of mask information.

FIG. 13 is a schematic diagram showing a configuration example of the mask information 4c.

The mask information 4c includes information for designating the video data 4a stored in the storage medium 4 and information for designating the mask data 4b applied to the video data 4a. When any one of the video data 4a stored by the storage medium 4 is selected as a video source, the mask data 4b corresponding to the selected video data 4a can be specified by the mask information 4c. The mask information 4c includes information concerning setting of the mask data 4b. The information includes, for example, a part of or the entire content edited by the illumination effect editing processing (FIG. 7). The mask information 4c and mask information 17 explained below are equivalent to correspondence information.

Therefore, by referring to the mask information 4c, the control section 10 can select the video data 4a and select the mask data 4b corresponding to the video data 4a. Further, the control section 10 executes, on the basis of the mask information 4c, as edited by the illumination effect editing processing, processing for combining the filter image P2 generated from the mask data 4b with the original image P1 based on the video data 4a. Therefore, it is possible to automatically project the combined image P3 without going through the processing by the operation section 31.

Figure 14:
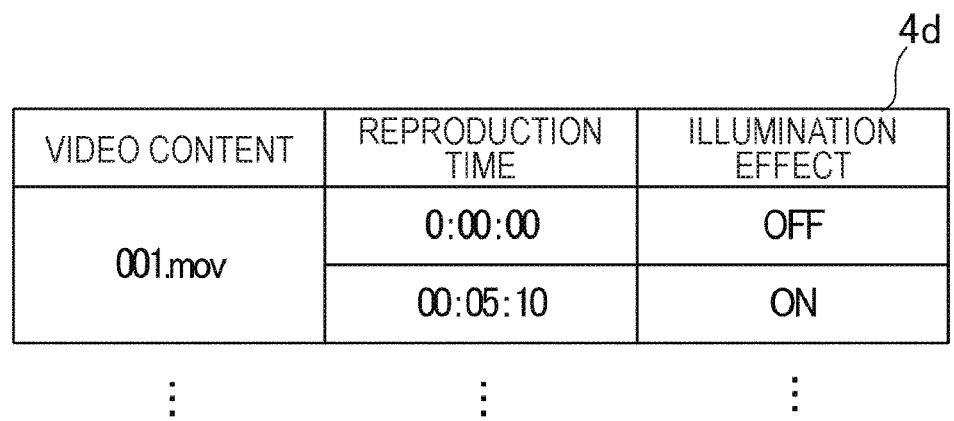
FIG. 14 is a schematic diagram showing a configuration example of schedule information.

FIG. 14 is a schematic diagram showing a configuration example of the schedule information 4d.

The schedule information 4d includes information for designating timing for combining the filter image P2 during reproduction of content when a video source is the content, that is, a target of the illumination effect is the content. The schedule information 4d and schedule information 18 explained below are equivalent to combination information.

In the example shown in FIG. 14, the schedule information 4d includes information for specifying video content (e.g., a file name of the video data 4a), reproduction time of content, and information for designating ON and OFF of the illumination effect by the mask data 4b. The reproduction time of content indicates, for example, an elapsed time from a reproduction start. In FIG. 14, content for switching ON and OFF of the illumination effect according to the reproduction time is shown in an example in which one mask data 4b is applied to the video data 4a. In this case, the control section 10 causes, according to the schedule information 4d, the OSD generating section 43 to switch processing for superimposing the filter image P2 on the original image P1 and outputting the combined image P3 and processing for outputting the original image P1.

The schedule information 4d may be data for setting a plurality of mask data 4b with respect to one video content and designating timing when the respective mask data 4b is applied to the video content. When the video content is configured by a plurality of files, the schedule information 4d may include file names of a plurality of files as data for designating the video content.

Figure 15:
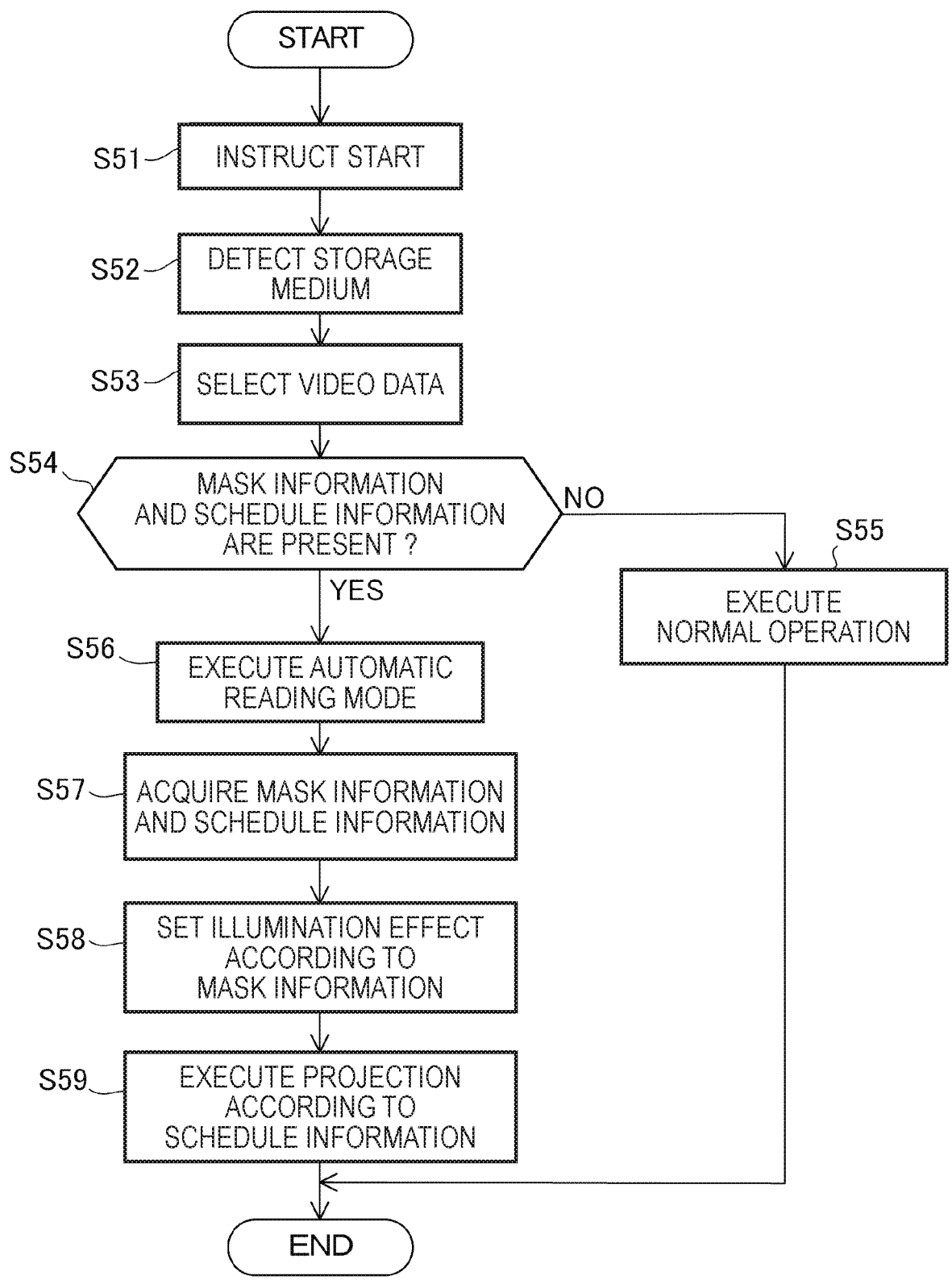
FIG. 15 is a flowchart for explaining the operation of the projector in the second embodiment.

FIG. 15 is a flowchart for explaining the operation of the projector 1 in the second embodiment.

When a start of video projection that makes use of the illumination effect is instructed by the operation section 31 (step S51), the control section 10 detects the storage medium 4 with the medium reading section 32 (step S52). Any one of the video data 4a stored in the storage medium 4 is selected by operation of the operation section 31 (step S53). The control section 10 determines whether the mask information 4c and the schedule information 4d corresponding to the selected video data 4a are stored in the storage medium 4 (step S54).

The control section 10 may perform the selection of the video data 4a in step S53 automatically or according to preset order. For example, the control section 10 may search for the video data 4a stored in the storage medium 4 and, when there is only one video data 4a, select the video data 4a. The control section 10 may select the video data 4a in preset order according to file names of the video data 4a.

When the mask information 4c and the schedule information 4d corresponding to the video data 4a are present (YES in step S54), the control section 10 executes an automatic reading mode (step S56) and acquires the mask information 4c and the schedule information 4d (step S57).

The control section 10 performs, according to the acquired mask information 4c, setting concerning processing for generating the filter image P2 from the mask data 4b (step S58).

The control section 10 executes projection of a video according to the schedule information 4d (step S59). In step S59, the control section 10 inputs, according to the setting, a video signal to the video processing section 40 on the basis of the video data 4a selected in step S53. The control section 10 acquires the mask data 4b designated by the mask information 4c and inputs the mask data 4b to the video processing section 40. The video processing section 40 draws the filter image 48a on the basis of the mask data 4b. The OSD generating section 43 generates the filter image P2 on the basis of the filter image 48a. The OSD generating section 43 converts luminance information into transmittance according to content set by the mask information 4c. Besides, the OSD generating section 43 determines, for example, a size, a shape, and a color of the filter image P2 and a position where the filter image P2 is generated in the filter image 48a. The control section 10 causes, at timing set by the schedule information 4d, the OSD generating section 43 to switch ON and OFF of processing for combining the filter image P2 with the original image P1.

That is, in a state in which the storage medium 4 is readable by the medium reading section 32, when the video data 4a and the mask information 4c and the schedule information 4d corresponding to the video data 4a are stored in the storage medium 4, the control section 10 automatically executes processing.

When the video data 14, the mask data 15, the mask information 17, and the schedule information 18 are stored in the storing section 11, the operation shown in FIG. 15 may be executed on the basis of these data. Specifically, when the video data 14 is selected, if only the mask information 17 and the schedule information 18 corresponding to the selected video data 14 are stored, the control section 10 can execute the operation in steps S56 to S59. In this case, the control section 10 acquires the selected video data 14 and the mask data 15 designated by the mask information 17 corresponding to the video data 14 and projects a video according to the mask information 17 and the schedule information 18.

When either the mask information 4c or the schedule information 4d corresponding to the video data 4a is absent in the storage medium 4 in step S54 (NO in step S54), the control section 10 executes a normal operation (e.g., the operation explained in the first embodiment) (step S55).

In step S54, the control section 10 may determine whether the mask data 4b designated by the mask information 4c corresponding to the video data 4a is present in the storage medium 4. In this case, when the designated mask information 4c is absent, the control section 10 may end the processing shown in FIG. 15.

In step S54 in FIG. 15, when the mask information 4c and the schedule information 4d are stored in the storage medium 4, the control section 10 may read out these kinds of information together with the video data 4a and the mask data 4b and cause the storing section 11 to store the information.

According to the operation in the second embodiment, the projector 1 can obtain the same operational effect as the operational effect in the first embodiment. In the second embodiment, the OSD generating section 43 generates the combined image P3 according to the mask information 4c or 17 that associates the video data 4a and the mask data 4b or the video data 14 and the mask data 15. Consequently, it is possible to perform, beforehand, setting concerning processing for combining the filter image P2 with the original image P1 and cause the projector 1 to automatically perform projection according to the setting.

The OSD generating section 43 generates the combined image P3 according to the schedule information 4d for deciding timing (e.g., reproduction time) for displaying the combined image P3 on the image forming section 20 and content of processing for generating the combined image P3 with the OSD generating section 43. Consequently, it is possible to set content of processing for combining images according to timing for projecting the combined image P3.

The projector 1 includes the medium reading section 32 that reads data stored in the storage medium 4. When the video data 4a, the mask data 4b, and the schedule information 4d are read from one storage medium 4 by the medium reading section 32, the projector 1 performs processing according to the read schedule information 4d. In this case, the OSD generating section 43 generates the combined image P3 on the basis of the read video data 4a and the read mask data 4b. Consequently, by causing the one storage medium 4 to store the video data 4a, the mask data 4b, and the schedule information 4d, it is possible to automate the processing for combining the filter image P2 with the original image P1.

The projector 1 includes the I/F section 33 functioning as an input section to which data is input. The control section 10 may generate the combined image P3 according to video data, mask data, and schedule information input to the I/F section 33. Consequently, by inputting the video data 14, the mask data 15, and the mask information 17 to the I/F section 33, it is possible to automate the processing for combining the filter image P2 with the original image P1.

Note that the embodiments and the modifications explained above are only examples of a specific mode applied with the invention and do not limit the invention. The invention can also be applied as modes different from the embodiments.

For example, in the embodiments, the configuration is illustrated in which the video processing section 40 is incorporated in the projector 1. However, the invention is not limited to this. For example, the video processing section 40 may be provided in a device configured separately from the projector 1. Further, the video processing section 40 is not limited to be configured by the hardware such as the ASIC. One processor may realize the video processing section 40 by executing a computer program.

The display device according to the invention is not limited to the projector that projects an image onto the screen SC. The display device may be, for example, a liquid crystal display including a liquid crystal display panel. The display device may be, for example, a display including a PDP (plasma display panel) or an organic EL display panel. The invention is also applicable to other various display devices.

The functional sections shown in FIGS. 1, 2, and 12 indicate functional components of the projector 1. Specific implementation forms of the functional sections are not particularly limited. That is, hardware individually corresponding to the functional sections do not always need to be implemented. It is naturally possible to adopt a configuration in which one processor executes computer programs to realize functions of a plurality of functional sections. A part of functions realized by software in the embodiments may be realized by hardware. Alternatively, a part of functions realized by hardware in the embodiments may be realized by software. Specific detailed components of the other sections can be optionally changed in a range not departing from the spirit of the invention.

What is claimed is:

1. A display device comprising:
    a processor configured to generate a third image by combining, on the basis of transmittance, a first image based on first image information and a second image generated by converting luminance information of second image information including the luminance information into the transmittance; and
    a display configured to display the third image, wherein the processor is further configured to
        cause the display to display an image for selection corresponding to each of a plurality of kinds of the second image information,
        process the second image information corresponding to the image for selection selected from a displayed plurality of the images for selection,
        select, from a selectable plurality of conversion systems, a conversion system for converting the luminance information of the second image information into the transmittance, and
        combine the second image, the luminance information of which is converted into the transmittance by the conversion system selected by the processor, and the first image.

2. The display device according to claim 1, wherein
    the first image includes a plurality of pixels,
    the second image information includes luminance information for each of regions including a plurality of pixels or each of the pixels, and
    the processor is configured to combine, with the first image, on the basis of the second image information, the second image including a plurality of pixels and having transmittance for each of regions including the plurality of pixels or each of the pixels to generate the third image.

3. The display device according to claim 1, wherein the processor is configured to adjust a form of combining, with the first image, the second image generated from the second image information corresponding to the selected image for selection.

4. The display device according to claim 3, wherein the processor is configured to adjust at least one or more of a position of a range combined with the first image in the second image, a size of the range combined with the first image in the second image, a shape of the range combined with the first image in the second image, a color of the second image, and concentration in combining the second image with the first image.

5. The display device according to claim 1, wherein the image for selection is an achromatic image generated from the second image information.

6. The display device according to claim 1, wherein the image for selection is the second image generated from the second image information.

7. The display device according to claim 1, wherein the processor is configured to generate the third image according to correspondence information that associates the first image to be combined and the second image information or the second image to be combined.

8. The display device according to claim 7, wherein the processor is configured to generate the third image according to combination information for deciding timing when the display displays the third image and content of processing for generating the third image with the processor.

9. The display device according to claim 7, the processor being further configured to read data stored in a storage medium, wherein
    when the first image information, the second image information, and the correspondence information are read from a single storage medium by the processor, the processor is configured to generate, according to the correspondence information read by the processor, the third image on the basis of the first image information and the second image information.

10. A control method for a display device including a display, the control method comprising:
    generating a third image by combining, on the basis of transmittance, a first image based on first image information and a second image generated by converting luminance information of second image information including the luminance information into the transmittance;
    displaying with the display an image for selection corresponding to each of a plurality of kinds of the second image information;
    processing the second image information corresponding to the image for selection selected from a displayed plurality of the images for selection;
    selecting, from a selectable plurality of conversion systems, a conversion system for converting the luminance information of the second image information into the transmittance;
    combining the second image, the luminance information of which is converted into the transmittance by the selected conversion system, and the first image; and
    displaying the third image with the display.

* * * * *